US012499861B2

(12) United States Patent
Ishii et al.

(10) Patent No.: US 12,499,861 B2
(45) Date of Patent: Dec. 16, 2025

(54) PRESSURE FLUCTUATION ABSORBING STRUCTURE

(71) Applicant: JAPAN AEROSPACE EXPLORATION AGENCY, Tokyo (JP)

(72) Inventors: Tatsuya Ishii, Tokyo (JP); Hideshi Oinuma, Tokyo (JP); Kenichiro Nagai, Tokyo (JP); Shunji Enomoto, Tokyo (JP); Junichi Oki, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 244 days.

(21) Appl. No.: 18/246,769

(22) PCT Filed: Aug. 25, 2021

(86) PCT No.: PCT/JP2021/031195
§ 371 (c)(1),
(2) Date: Mar. 27, 2023

(87) PCT Pub. No.: WO2022/091542
PCT Pub. Date: May 5, 2022

(65) Prior Publication Data
US 2023/0360626 A1 Nov. 9, 2023

(30) Foreign Application Priority Data
Oct. 30, 2020 (JP) ................................ 2020-182259

(51) Int. Cl.
*G10K 11/168* (2006.01)
*B32B 3/12* (2006.01)
(Continued)

(52) U.S. Cl.
CPC .............. *G10K 11/168* (2013.01); *B32B 3/12* (2013.01); *B32B 3/266* (2013.01);
(Continued)

(58) Field of Classification Search
CPC ...... G10K 11/168; G10K 11/172; B32B 3/12; B32B 23/266; B32B 2307/7376; B32B 2307/102; B32B 2605/18
(Continued)

(56) References Cited

U.S. PATENT DOCUMENTS 3,850,261 A * 11/1974 Hehmann ................ F02C 7/24 181/286
4,318,453 A 3/1982 Rose et al.
(Continued)

FOREIGN PATENT DOCUMENTS

GB 2 005 384 A 4/1979
JP 2002-337094 A 11/2002
(Continued)

OTHER PUBLICATIONS

Office Action dated Apr. 23, 2024 in Japanese Application No. 2022-558874.
(Continued)

*Primary Examiner* — Forrest M Phillips
(74) *Attorney, Agent, or Firm* — Saliwanchik, Lloyd & Eisenschenk

(57) ABSTRACT

A pressure fluctuation absorbing structure includes: a perforated member including a plurality of holes for absorbing pressure fluctuation on a surface thereof; and a partition member disposed on the surface of the perforated member and including a partition wall that partitions the plurality of holes in units of a predetermined number of one or more holes, and a space that is formed by the partition wall and corresponds to the predetermined number of one or more holes.

24 Claims, 27 Drawing Sheets

(51) Int. Cl.
*B32B 3/26* (2006.01)
*G10K 11/172* (2006.01)

(52) U.S. Cl.
CPC . *B32B 2307/102* (2013.01); *B32B 2307/7376* (2023.05); *B32B 2605/18* (2013.01); *G10K 11/172* (2013.01)

(58) Field of Classification Search
USPC .......................................................... 181/288
See application file for complete search history.

(56) References Cited

U.S. PATENT DOCUMENTS

| | | | | |
|---|---|---|---|---|
| 4,339,018 A * | 7/1982 | Warnaka | E04B 1/82 181/292 |
| 5,997,985 A * | 12/1999 | Clarke | B32B 3/12 428/116 |
| 6,202,786 B1 * | 3/2001 | Pfaffelhuber | B29C 51/16 181/290 |
| 6,220,388 B1 * | 4/2001 | Sanborn | E04B 9/0457 181/290 |
| 6,827,180 B2 * | 12/2004 | Wilson | B23K 26/389 181/292 |
| 8,733,500 B1 * | 5/2014 | Ayle | F02C 7/24 181/292 |
| 9,469,985 B1 * | 10/2016 | Ichihashi | E04B 1/84 |
| 10,332,501 B2 * | 6/2019 | Lin | B32B 7/12 |
| 11,715,450 B2 * | 8/2023 | Quesada | G10K 11/168 181/284 |
| 2002/0047070 A1 | 4/2002 | Breer et al. | |
| 2007/0267246 A1 | 11/2007 | Ali et al. | |
| 2010/0077754 A1 | 4/2010 | Jangili | |
| 2011/0142615 A1 | 6/2011 | Riou et al. | |
| 2013/0075193 A1 | 3/2013 | Vavalle | |
| 2019/0161199 A1 | 5/2019 | Lacko et al. | |
| 2023/0260497 A1 * | 8/2023 | Taira | G10K 11/172 181/284 |

FOREIGN PATENT DOCUMENTS

| | | |
|---|---|---|
| JP | 2006-2869 A | 1/2006 |
| JP | 2007-309326 A | 11/2007 |
| JP | 2010-84768 A | 4/2010 |
| JP | 2011-530675 A | 12/2011 |
| JP | 2013-522511 A | 6/2013 |
| JP | 2013-140248 A | 7/2013 |
| JP | 2018-66914 A | 4/2018 |
| JP | 2019-138977 A | 8/2019 |
| JP | 2019-158942 A | 9/2019 |
| JP | 2020-16694 A | 1/2020 |
| JP | 2020-91324 A | 6/2020 |

OTHER PUBLICATIONS

Supplementary European Search Report dated Aug. 22, 2024 in European Application No. 21885661.5.
Office Action dated Dec. 4, 2023 in Japanese Application No. 2022-558874.
International Search Report dated Nov. 30, 2021 in International Application No. PCT/JP2021/031195.
Office Action dated Oct. 2, 2025 in European Application No. 21 885 661.5.

* cited by examiner (A)

(B)

FIG. 25(b)
(B)
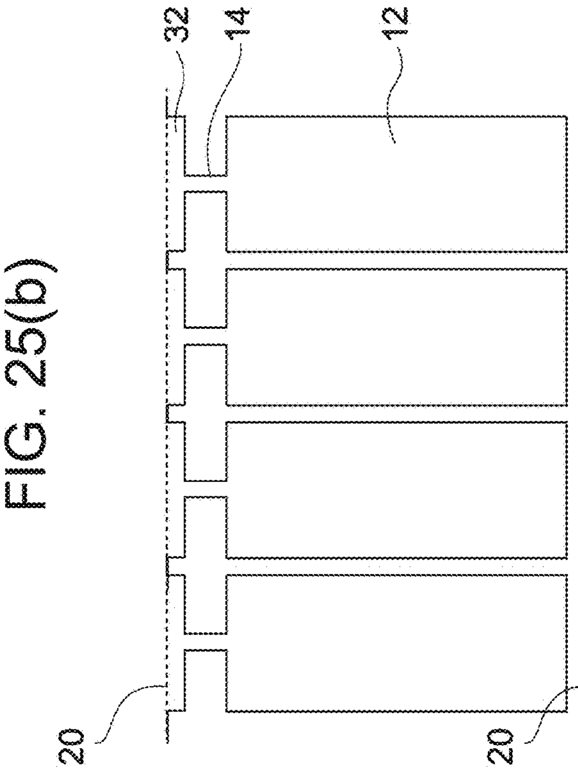
(C)
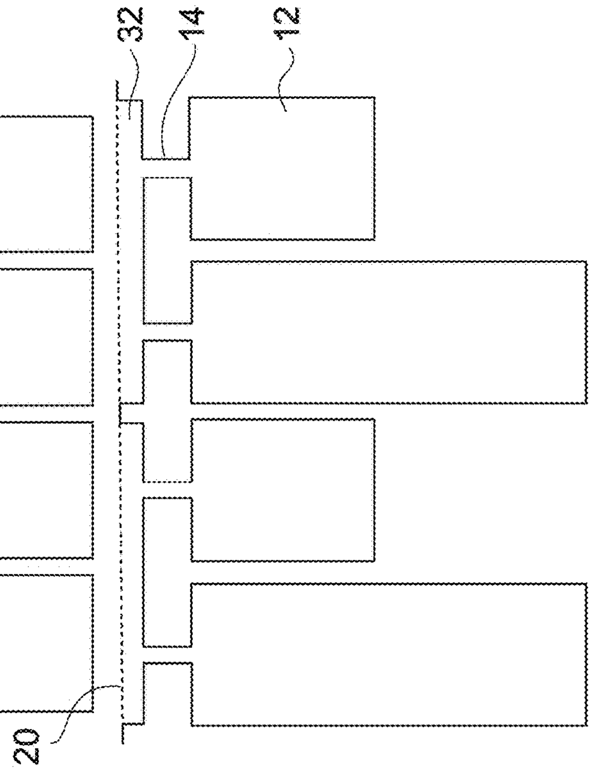
FIG. 25(c)
FIG. 25(a)
(A)
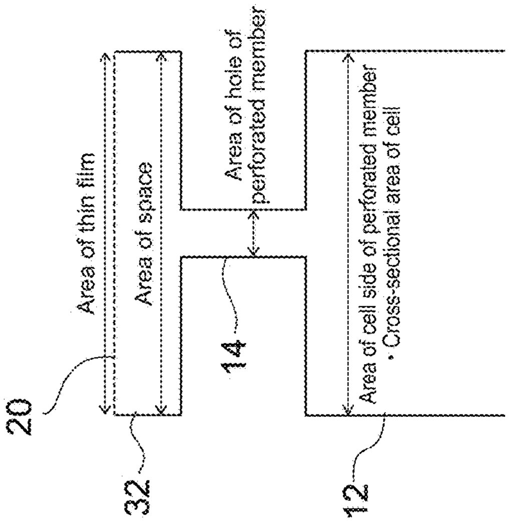

PRESSURE FLUCTUATION ABSORBING STRUCTURE

CROSS-REFERENCE TO RELATED APPLICATIONS

This application is the U.S. national stage application of International Patent Application No. PCT/JP2021/031195, filed Aug. 25, 2021, which claims the benefit under 35 U.S.C. § 119 of Japanese Application No. 2020-182259, filed Oct. 30, 2020, the disclosures of each of which are incorporated herein by reference in their entirety.

TECHNICAL FIELD

The present invention relates to a pressure fluctuation absorbing structure, which is installed on a duct inner wall to attenuate, for example, noise of a fan of a jet engine, noise of a combustor, noise of a turbine, and noise of a ducted propeller in a noise propagation path. The present invention relates to an acoustic absorption panel applicable to: an improvement in noise reduction capability of systems in which noise propagates in an airflow, such as aircraft, aircraft engines, power generators, motors, and air-conditioned refrigerators; an improvement in acoustic absorption performance of general transportation equipment such as automobiles, trains, and aircraft in which an airflow and noise are mixed on the surface thereof; an improvement in structure strength of a noise reduction apparatus; an improvement in performance of a main body apparatus by the noise reduction apparatus; and the like.

BACKGROUND ART

The acoustic absorption panel has effects of absorbing energy of a sound that enters the surface thereof or propagates through the surface and reducing the amplitude of the sound (sound pressure). In a case of an aeroengine, the acoustic absorption panel is installed on the inner surface of a duct (nacelle) surrounding the engine and trialed in a flow field of suction or exhaust air. Frequencies at which the sound can be attenuated depend on the shape of the acoustic absorption panel, but in the case of a nacelle, typically range from several hundred Hz to several kHz.

The acoustic absorption panel includes a back plate that does not transmit a sound or a flow, groups of small spaces partitioned by walls (cell structure), and a surface plate with a large number of holes. The cell structure is sandwiched by the back plate and the surface plate and has a so-called sandwich structure, which determines a resonant frequency determined on the basis of a hole diameter of the surface plate, a plate thickness, an opening ratio, and a cell dimension. As can be seen in the case of the aeroengine, the condition in which an airflow is present on the surface of the acoustic absorption panel is referred to as a Grazing condition. The acoustic absorption panels including, but not limited to one utilizing such a resonance, one made of a porous material are also known as exhibiting acoustic absorption characteristics different from those in a stationary field under the Grazing condition.

Conventionally, some technologies regarding a resonant acoustic absorption panel have been disclosed (see Patent Literatures 1 to 10).

CITATION LIST

Patent Literature

Patent Literature 1: Japanese Patent Application Laid-open No. 2007-309326

Patent Literature 2: Japanese Unexamined Patent Application Publication No. 2013-522511

Patent Literature 3: Japanese Unexamined Patent Application Publication No. 2011-530675

Patent Literature 4: Japanese Patent Application Laid-open No. 2006-2869

Patent Literature 5: Japanese Patent Application Laid-open No. 2002-337094

Patent Literature 6: Japanese Patent Application Laid-open No. 2010-84768

Patent Literature 7: Japanese Patent Application Laid-open No. 2013-140248

Patent Literature 8: Japanese Patent Application Laid-open No. 2019-138977

Patent Literature 9: Japanese Patent Application Laid-open No. 2020-016694

Patent Literature 10: Japanese Patent Application Laid-open No. 2020-091324

DISCLOSURE OF INVENTION

Technical Problem

The acoustic absorption panel used for an aircraft engine is often used under a condition where an airflow of a low Mach number (about 0.2 to 0.6) is present (Grazing condition). The conventional technologies have a problem in that the acoustic absorption panel shows a maximum acoustic absorption coefficient at a resonant frequency determined on the basis of the shape, whereas the maximum acoustic absorption coefficient at the resonant frequency is reduced under the Grazing condition. Increasing an acoustic absorption area in order to compensate for the reduction of the maximum acoustic absorption coefficient, i.e., a degradation in acoustic performance of a design point, leads to fatal drawbacks other than the acoustic aspect, such as an increase in weight and an increase in pressure drop of the airflow. From the opposite viewpoint, if an acoustic absorption panel with an improved acoustic absorption coefficient can be achieved under the Grazing condition, acoustic absorption panels having different resonant frequencies and having the same area can be juxtaposed, and it is expected to provide an effect of improving the acoustic absorption performance over a wide frequency band.

The acoustic absorption panel also has a problem of a structure strength. Damage to the surface plate caused by a collision during suction of foreign matter is a fatal problem in the acoustic absorption panel formed of a resin or the like for the purpose of weight reduction. Increasing the thickness of the surface plate to increase impact resistance leads to a problem of a weight increase.

Patent Literature 10 discloses "a pressure fluctuation absorbing structure including: a perforated member including a hole for absorbing pressure fluctuation provided on the surface; and a thin film that is disposed on the surface of the perforated member and includes a plurality of small holes perforated in a region corresponding to at least the hole".

According to the configuration in which the thin film is directly disposed on the surface of the perforated member, since the inflow of the airflow may remain on the surface side of the hole of the perforated member, there is a possibility that an acoustic particle velocity becomes insufficient at a front edge and a rear edge, energy loss is decreased, or acoustic absorption performance is deteriorated. Further, if the thickness of the thin film is small or the airflow velocity is slow, there is a possibility that the influence of the entrainment of the airflow from the small hole of the thin film is increased, and thus energy dissipation may become insufficient at the edge (corner portion) of the hole of the perforated member, and an acoustic absorption coefficient may be decreased.

In view of the circumstances as described above, it is an object of the present invention to provide a pressure fluctuation absorbing structure capable of suppressing a decrease in pressure fluctuation absorption performance due to an airflow on a surface and a separation in resonant frequency.

Solution to Problem

In order to achieve the above object, a pressure fluctuation absorbing structure according to an embodiment of the present invention includes: a perforated member including a plurality of holes for absorbing pressure fluctuation on a surface thereof; and a partition member disposed on the surface of the perforated member and including a partition wall that partitions the plurality of holes in units of a predetermined number of one or more holes, and a space that is formed by the partition wall and corresponds to the predetermined number of one or more holes.

In the pressure fluctuation absorbing structure according to an embodiment of the present invention, the partition member including the space is disposed on the surface of the perforated member, so that a decrease in acoustic absorption coefficient or a shift of a resonant frequency can be suppressed typically when an airflow (Grazing flow) is present on the surface, and acoustic performance is improved as compared to the conventional technologies.

In a favorable embodiment, a depth of the space is larger than a diameter of the hole of the perforated member. The depth of the space is larger than the diameter of the hole of the perforated member, so that the influence of the airflow on the hole is reduced.

In a more favorable embodiment, the depth of the space is larger than twice the diameter of the hole of the perforated member. The depth of the space is larger than twice the diameter of the hole of the perforated member, so that the influence of the airflow on the hole is further reduced.

In a favorable embodiment, the hole is located at least at the center to an upstream side of the space with respect to a main flow direction of a fluid on a surface of the pressure fluctuation absorbing structure. The hole is located on the upstream side, so that an acoustic absorption coefficient is increased.

In a favorable embodiment, the pressure fluctuation absorbing structure further includes a thin film that is disposed on the partition member away from the perforated member to cover the space and includes a plurality of small holes perforated in a region corresponding to at least the space.

In the pressure fluctuation absorbing structure according to an embodiment of the present invention, the thin film including the plurality of small holes perforated in the region corresponding to the hole is disposed on the surface of the partition member via the space, so that a decrease in acoustic absorption coefficient or a shift of a resonant frequency can be suppressed typically in a case where an airflow (Grazing flow) is present on the surface, and acoustic performance is improved as compared to the conventional technologies.

A total opening area of the plurality of small holes of the thin film provided in the region corresponding to the space is larger than, in a favorable embodiment, larger than twice a total opening area of the predetermined number of one or more holes of the perforated member corresponding to the space. This can inhibit a decrease in acoustic absorption performance due to the Grazing flow.

The total opening area of the plurality of small holes of the thin film provided in the region corresponding to the space is larger than, in a more favorable embodiment, larger than four times the total opening area of the predetermined number of one or more holes of the perforated member corresponding to the space. This can further inhibit a decrease in acoustic absorption performance due to the Grazing flow.

In a favorable embodiment, a diameter of the small hole of the thin film is larger than 1/20 and smaller than 1/5 of the diameter of the hole of the perforated member.

In a favorable embodiment, an opening ratio of the thin film by the plurality of small holes corresponding to the space is 10% or more. The opening ratio of the thin film is set to 10% or more, so that an effect of improving an acoustic absorption coefficient is obtained.

In a more favorable embodiment, the opening ratio of the thin film by the plurality of small holes corresponding to the space is 30% or more. The opening ratio of the thin film is made as large as possible, so that an effect of improving an acoustic absorption coefficient is obtained.

The opening ratio of the thin film by the plurality of small holes corresponding to the space is larger than, in a favorable embodiment, larger than twice an opening ratio of the perforated member by the predetermined number of one or more holes corresponding to the space.

The opening ratio of the thin film by the plurality of small holes corresponding to the space is larger than, in a more favorable embodiment, larger than four times the opening ratio of the perforated member by the predetermined number of one or more holes corresponding to the space.

The thin film is disposed on a surface of the partition member or disposed on a side surface of the partition wall of the partition member. In such a manner, if the space can be provided between the surface of the perforated member and the thin film, the position of thin film is not limited, and a high degree of freedom is obtained.

The thin film may include a first thin film disposed on a surface of the partition member, and a second thin film disposed on a side surface of the partition wall of the partition member, and in a region corresponding to the space, an opening ratio of the second thin film by a plurality of small holes perforated in the second thin film may be larger than an opening ratio of the first thin film by a plurality of small holes perforated in the first thin film. The first thin film and the second thin film are disposed to improve the acoustic absorption performance between the first thin film and the second thin film.

The perforated member may have a surface inclined with respect to the thin film.

A distance between the surface of the perforated member and the thin film in a depth direction of the space may be different between an upstream side and a downstream side in a main flow direction of a fluid on a surface of the pressure fluctuation absorbing structure. The depth of the space is different between the upstream side and the downstream side in the main flow direction, which makes it possible to control the distribution of a sound pressure or a particle velocity and enhance the acoustic absorption performance.

The thin film may have a surface inclined with respect to the main flow direction of the fluid on the surface of the pressure fluctuation absorbing structure.

A thickness of the thin film may be 1/10 or more of the diameter of the small hole. If the order is not the same, that is, an aspect ratio (in this specification, a ratio of the thickness of the thin film to the diameter of the small hole) is large, i.e., 1 or more, flow resistance on the thin film is increased rapidly. As a result, there is a possibility that the effect of improving the acoustic absorption coefficient is not expected.

The small hole of the thin film may have a hole diameter that transmits pressure fluctuation, and the small hole of the thin film may have a hole diameter having an effect of inhibiting the transmission of the fluid in the main flow direction on the surface of the pressure fluctuation absorbing structure. Thus, the thin film has fluid impermeability of restricting the introduction of the flow by the Grazing flow into a cell structure and also has acoustic transmission property of allowing the introduction of a pressure by sound waves propagating through a flow path (surface) into a cell structure.

The thin film may be formed by laminating thin film materials subjected to etching processing.

A cross-sectional shape of the small hole may be a rectangular shape, a parallelogram shape, or a trapezoidal shape.

The fluid on the surface of the pressure fluctuation absorbing structure may have a main flow velocity. In other words, the fluid on the surface of the pressure fluctuation absorbing structure may have a unidirectional velocity. Thus, it is effective to apply the pressure fluctuation absorbing structure as an acoustic absorption panel to each site of an aircraft.

The main flow velocity may be a supersonic velocity. Thus, it is effective to apply the pressure fluctuation absorbing structure as an acoustic absorption panel to each site of an aircraft.

A back surface of the perforated member may be capable of being provided with a cell that communicates with one or more of the holes, and the space of the partition member may correspond to one or more of the cell. Thus, it is expected to enhance the acoustic absorption performance at an acoustic resonant frequency of each cell.

The space of the partition member may be shared by a plurality of the cells. This makes it possible to inhibit the acoustic absorption performance from decreasing even if the cross-sectional area of the cell is small.

The perforated member may be a surface plate of a bulk-type acoustic absorption material of a porous material, a fibrous material, or the like.

Advantageous Effects of Invention

According to the present invention, it is possible to suppress a decrease in pressure fluctuation absorption performance due to an airflow on a surface and a separation in resonant frequency.

Note that the effects described herein are not necessarily limited and may be any of the effects described in the present disclosure.

BRIEF DESCRIPTION OF DRAWINGS

FIGS. 25(*a*)-25(*c*) show a modified example of an acoustic absorption panel.

MODE(S) FOR CARRYING OUT THE INVENTION

Hereinafter, embodiments of the present invention will be described with reference to the drawings.

Schematic Structure of Acoustic Absorption Panel

Figure 1:
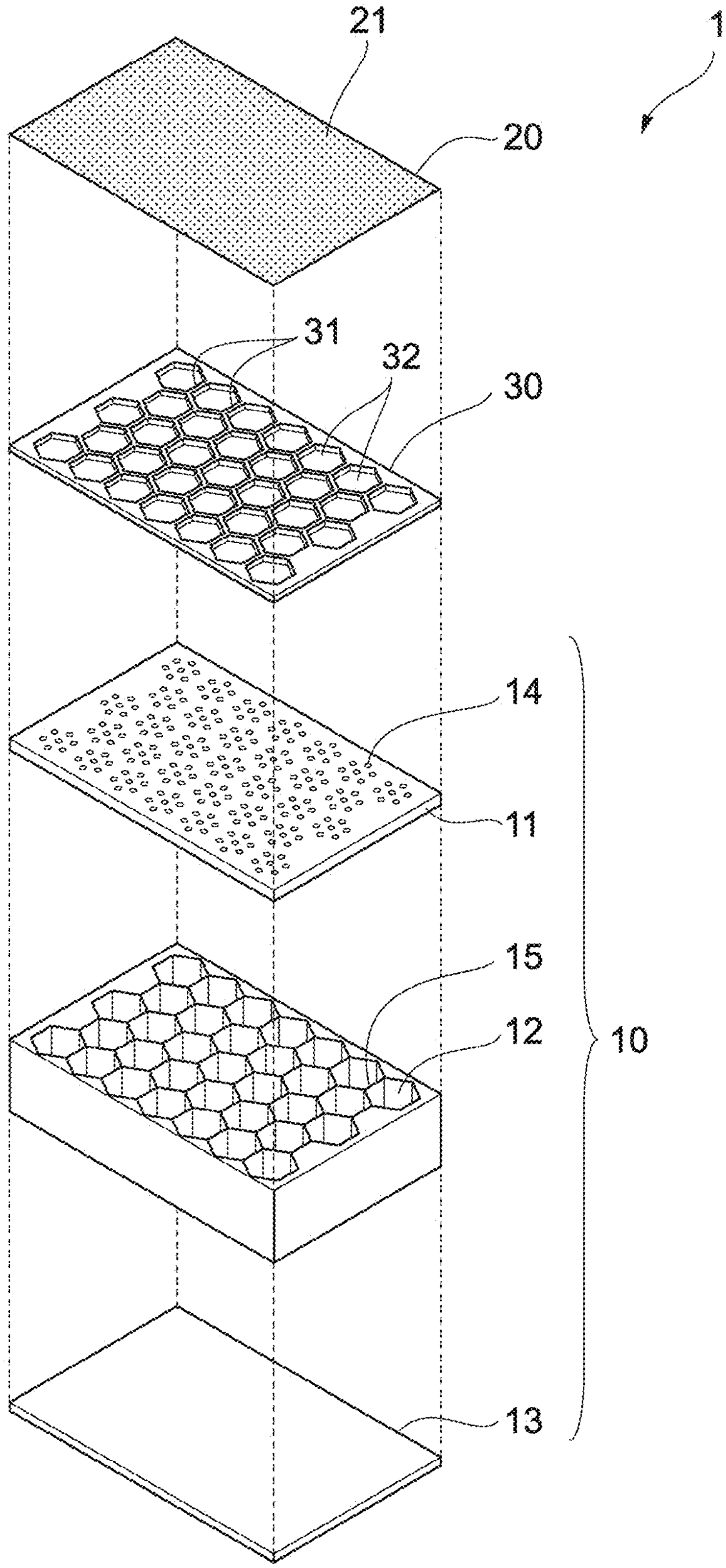
FIG. 1 is an exploded perspective view of an acoustic absorption panel 1 as a pressure fluctuation absorbing structure according to an embodiment of the present invention.
Figure 27:
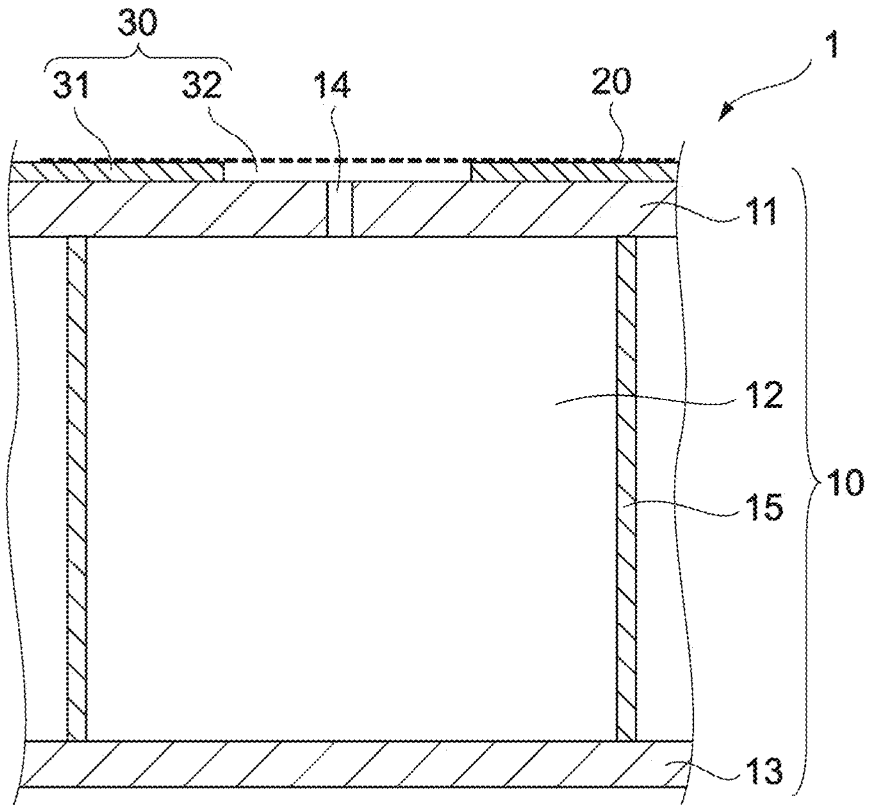
FIG. 27 is an enlarged longitudinal vertical cross-sectional view of a part of the acoustic absorption panel.
Figure 28:
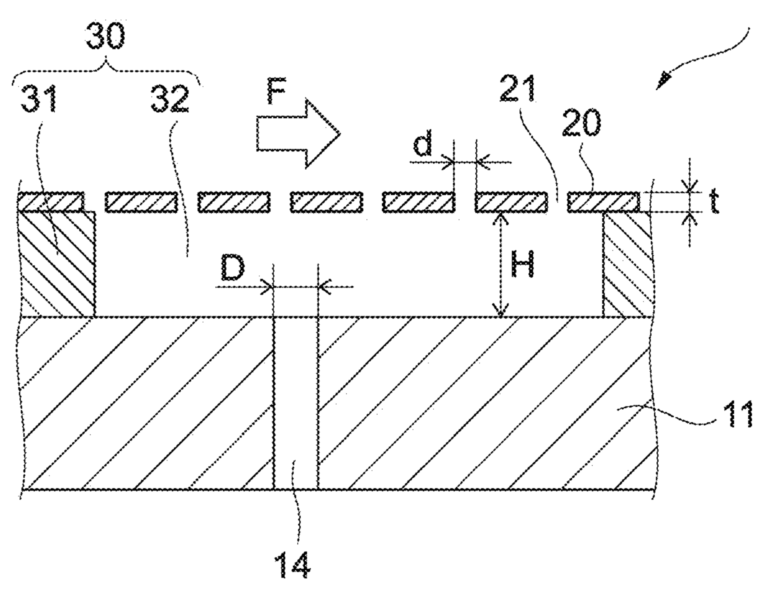
FIG. 28 is an enlarged view of the vicinity of holes in a part of the acoustic absorption panel.

FIG. 1 is an exploded perspective view of an acoustic absorption panel 1 as a pressure fluctuation absorbing structure according to an embodiment of the present invention. FIG. 27 is an enlarged longitudinal vertical cross-sectional view of a part of the acoustic absorption panel 1. FIG. 28 is an enlarged view of the vicinity of a hole 14 thereof.

As shown in FIGS. 1, 27, and 28, the acoustic absorption panel 1 is constituted by attaching a partition member 30 (space adaptor) to a surface of an acoustic absorption panel main body 10 by using, for example, an adhesive (illustration is omitted) and attaching a thin film 20 to a surface of the partition member 30 by using, a for example, an adhesive (illustration is omitted). Alternatively, the thin film 20 is disposed on the surface of the partition member 30 by a mechanical fixing method such as screws, welding, and the like without being limited to the adhesive.

The acoustic absorption panel main body 10 (pressure fluctuation absorbing structure) includes holes 14 for acoustic absorption as holes for pressure fluctuation absorption in the surface.

The partition member 30 includes partition walls 31, which partition the plurality of holes 14 in units of a predetermined number of one or more holes, and spaces 32 constituted by the partition walls and each corresponding to the predetermined number of one or more holes 14.

The thin film 20 includes a large number of small holes 21 perforated therein, and a plurality of small holes 21 are perforated in a region corresponding to at least the space 32.

Structure of Acoustic Absorption Panel Main Body

The acoustic absorption panel main body 10 is a conventional resonant acoustic absorption panel and, when no airflow is present on its surface, has a function of absorbing energy of sound waves passing through the surface. The surface of the acoustic absorption panel main body 10 may have not only a planar shape but also a curved shape or any shape as viewed from the space side from which sound waves are incident.

The resonant acoustic absorption panel main body 10 has a structure of three layers from the panel surface. Those layers are recognized as a perforated member 11, a cell 12, and a back wall 13. The perforated member 11 includes holes 14 for acoustic absorption perforated therein, and communicates between the air brought into contact with the perforated member 11 and the cell 12 via the holes 14. The perforated member 11 is a surface plate of the resonant acoustic absorption panel main body 10.

The cell 12 is a small space surrounded by the perforated member 11, the back wall 13, and a partition wall 15 that partitions the cell. In other words, the acoustic absorption panel main body 10 includes a plurality of cells 12. Note that, depending on an application use of the acoustic absorption panel main body 10, a small hole (not shown) for draining the water that has entered the cell may be provided in a part of the partition wall 15 that partitions the cell. There is also a structure of a multiple-layer acoustic absorption panel, so-called multilayer acoustic absorption panel, in which small holes (not shown) are provided in the back wall 13, and cells and a back layer are provided behind the back wall 13. The cells 12 are sandwiched between the perforated member 11 and the back wall 13, which may be referred to as "sandwich structure". The cross-sectional shape of the cell 12 is optional and may be triangular, quadrangular, polygonal, or circular. The hexagonal shape is particularly referred to as "honeycomb" structure. The cells 12 basically communicate with the outside through the holes 14 provided in the perforated member 11. It is assumed that the back wall 13 has sufficient rigidity with respect to vibration of air. Further, in normal handling, all of the partition walls 15 surrounding the cells 12 are handled as having sufficient rigidity as compared to the interior air.

The acoustic absorption panel main body 10 according to this embodiment is of a resonant type, and enhances acoustic absorption performance at an acoustic resonant frequency determined from the above structure. In general, sounds propagating in air form waves temporally reproducible by frequencies. Normally, sounds include a plurality of frequencies and sounds having an amplitude and a phase associated therewith. The acoustic absorption panel main body 10 enhances acoustic absorption performance in a frequency band centered on a particular frequency.

Here, a resonant frequency f of the acoustic absorption panel main body 10 can be roughly estimated as follows by a volume V of the cell 12, the sum s of the areas of the holes 14 of the perforated member 11 corresponding to the cell, and a length (i.e., corresponding to the thickness of the perforated member 11) 1 of the hole 14. Here, 1' is obtained by adding an opening edge correction quantity to 1.

$$f=c/2\pi\sqrt{(s/V1')}$$

When sound waves, that is, minute pressure fluctuation reaches the perforated member 11 of the acoustic absorption panel main body 10, the air inside the hole 14 of the perforated member 11 is displaced. When the air inside the hole 14 is pushed toward the cell 12 side, the air inside the cell 12 is compressed, and the air inside the cell 12 is pulled into the hole 14 and expands.

It should be noted that the volume of the hole 14 is sufficiently small as compared to the volume of the cell 12, and thus its volume change amount due to the compression and expansion is sufficiently small as compared to that of the volume of the cell 12. Since an incident sound to the hole 14 fluctuates in period (or frequency), the air inside the hole 14 is also displaced by the frequency of the incident sound waves, and consequently a minute pressure inside the cell 12 also fluctuates by the frequency of the incident sound waves.

Structure of Partition Member

The partition member 30 includes the partition walls 31 that partition the plurality of holes 14 of the perforated member 11 in units of a predetermined number of one or more holes, and spaces 32 configured by the partition walls 31 and each corresponding to the predetermined number of one or more holes 14.

The depth H of the space 32 (i.e., the height of the partition wall 31) is larger than a diameter D of the hole 14 of the perforated member 11 (H>D). The depth H of the space 32 is favorably larger than twice the diameter D of the hole 14 of the perforated member 11 (H>2D). The depth H of the space 32 is more favorably larger than four times the diameter D of the hole 14 of the perforated member 11 (H>4D). The holes 14 of the perforated member 11 are provided at least at a position corresponding to the middle to the upstream side of the space 32 (left side in the drawing) with respect to a main flow F direction of a fluid on the surface of the acoustic absorption panel 1 (i.e., the surface of the thin film 20). Note that FIG. 28 shows the arrow symbol indicating the main flow F, in which the front end side of the arrow indicates the downstream side of the main flow F, and the end side opposite to the front end indicates the upstream side of the main flow F.

Figure 2:
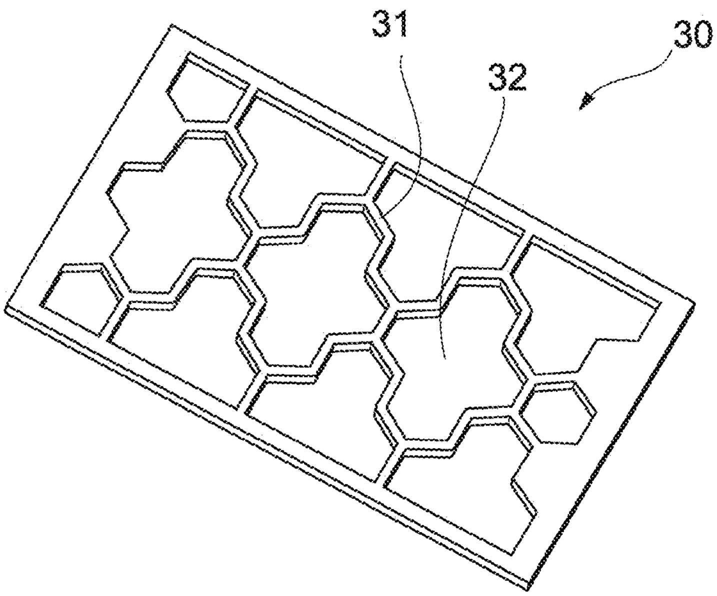
FIG. 2 shows a modified example of a partition member (space adaptor).

FIG. 2 shows a modified example of the partition member.

The cells 12 that each communicate with one or more holes 14 are provided to the back surface of the perforated member 11. The space 32 of the partition member 30 corresponds to one or more cells 12. In the example of FIG. 1, a single cell 12 communicates with seven holes 14, and a single space 32 corresponds to a single cell 12. Meanwhile, the space 32 of the partition member 30 may be shared by a plurality of cells 12. In the example of FIG. 2, a single space 32 corresponds to four cells 12, that is, shares four cells 12.

Structure of Thin Film

The thin film 20 is a fine-perforated-film (FPF). The thin film 20 is disposed on the partition member 30 so as to cover the spaces 32 while being away from the perforated member 11, and a large number of small holes 21 penetrating the front and back are perforated in the region corresponding to at least the spaces 32. In the example shown in FIGS. 1, 27, and 28, the thin film 20 is disposed on the surface of the partition member 30.

In this embodiment, the thin film 20 includes two or more small holes 21 in the region corresponding to the single space 32 of the partition member 30. Basically, a hole diameter d of the small hole 21 is determined by the hole diameter D of the hole 14 of the perforated member 11. The hole diameter d of the small hole 21 is about 1/10 of the hole diameter of the hole 14 of the perforated member 11. For example, the ratio of the hole diameter d of the small hole 21 to the hole diameter D of the hole 14 of the perforated member 11 is $\frac{1}{20}<d/D<\frac{1}{5}$. A general acoustic absorption panel has a hole diameter D of 1 to 2 mm. If D=1 mm, 0.05 mm<d<0.2 mm, and for example, approximately d=0.1 mm. If D=2 mm, 0.1 mm<d<0.4 mm, and for example, approximately d=0.2 mm.

It is desirable that an opening ratio σf of the thin film 20 is as large as possible. When the thin film 20 includes the small holes 21 uniformly perforated, the product of an opening ratio σa of the perforated member 11 and the opening ratio σf the thin film 20 becomes a substantial opening ratio (the area of the small holes 21 with respect to the area of the region corresponding to the holes 14), and thus it is favorable that the opening ratio σf of the thin film 20 is as large as possible. Specifically, when the small holes 21 are uniformly perforated in the thin film 20, the opening ratio σf the thin film 20 by the plurality of small holes 21 corresponding to the space 32 is favorably 10% or more, more favorably 30% or more, even more favorably 40% or more. Note that, in order to maintain the opening ratio of the small holes 21, the number of holes has to be increased as the hole diameter is made smaller.

The opening ratio σf of the thin film 20 by the plurality of small holes 21 corresponding to the space 32 is larger than, favorably larger than twice (σf>2σa), more favorably larger than four times (σf>4σa) the opening ratio σa of the perforated member 11 by the holes 14 (predetermined number of one or more holes) corresponding to the space 32. In such a manner, the optimum value of the opening ratio σf of the thin film 20 varies with the opening ratio σa of the perforated member 11 used in combination. In other words, the total opening area Sf of the thin film 20 corresponding to the space 32 is larger than, favorably larger than twice (Sf>2Sa), more favorably larger than four times (Sf>4Sa) the total opening area Sa of the perforated member 11 corresponding to the space 32.

The small hole 21 typically has a circular shape, but may have a shape other than a circular shape. For example, the small hole 21 may have a rectangular shape long in the main flow F direction.

The small holes 21 may be perforated in the entire surface of the thin film 20, but may be perforated in a region corresponding to the space 32 of the partition member 30, not in the other region. For example, the small holes 21 of the thin film 20 may be distributed only in the region corresponding to the space 32 of the partition member 30 and in the vicinity thereof. This makes it possible to suppress a disturbance caused by the small holes 21 in a region without the small holes 21 and to macroscopically expect resistance mitigation.

A thickness t of the thin film 20 is favorably in the same order as the hole diameter of the small hole 21. Specifically, the thickness t of the thin film 20 is $\frac{1}{10}$ or more of the diameter of the small hole 21. In other words, the ratio of the thickness t of the thin film 20 to the hole diameter d of the small hole 21 (aspect ratio=thickness t/hole diameter d) is favorably smaller than 2. If it is applied to an acoustic absorption panel of an inner wall of a general nacelle, the thickness t of the thin film 20 may be 0.1 to 0.25 mm. It should be noted that the thickness t of the thin film 20 and the hole diameter of the small hole 21 may vary depending on a target frequency or Grazing flow velocity.

Note that this embodiment handles the condition that an airflow is present in a flow path (three-dimensional or two-dimensional flow path) and a wall surface of the flow path is an acoustic absorption wall. The acoustic absorption wall has a surface that forms a perforated surface (if the thin film 20 is provided thereto, the thin film 20 forms the surface). The flow of the air flowing in the flow path is referred to as a main flow. The main flow is a unidirectional flow and is not a plurality of flows flowing in the opposite direction, a crossing flow, a secondarily excited flow, or a bypass (branched) flow.

The main flow velocity is uniform in the cross section of the flow path if the flow is non-viscous. When a region in which the flow decelerates (boundary layer) is formed in the vicinity of the wall surface due to the effect of viscosity, the velocity difference is generated between the center of the flow path and the vicinity of the wall surface. If the boundary layer is thin, a velocity distribution is obtained, in which the velocity is almost flat at the center portion of the flow path and rapidly decelerates only in the vicinity of the wall surface. Its degree depends on the thickness of the boundary layer.

The terms of "Grazing" and "Grazing flow" idiomatically mean flows along a surface (particularly, acoustic absorption wall surface).

It is favorable to use a hard material including metal and plastics as the material of the thin film 20. The thin film 20 including the small holes 21 may be formed by machining or may be formed by processing other than machining. The thin film 20 including the small holes 21 is typically formed through a process of laminating thin film materials subjected to etch processing. By being formed through the process of laminating the thin film materials subjected to etch processing, small holes 21 having a diameter of approximately 0.2 mm or less, which is a limit of machining, can be formed, and small holes 21 having a shape other than a circular shape can also be easily formed.

The thin film 20 having at least the above configuration has fluid nonpermeability of inhibiting a flow by a Grazing flow from being introduced into the cells 12 and acoustic transmission property of allowing a pressure by sound waves propagating through the flow path (surface) to be introduced into the cells 12. In other words, the small hole 21 has the hole diameter d that allows pressure fluctuation to pass therethrough and inhibits the fluid on the surface of the acoustic absorption panel 1 from passing therethrough in the main flow F direction.

While the Grazing flow peels from the front edge (boundary with the space 32) in the main flow F direction of the partition wall 31 of the partition member 30, it does not immediately flow into the space 32, and thus the uniformity of the acoustic particle velocity at the hole portion 14 of the perforated member 11 is maintained.

Figure 3:
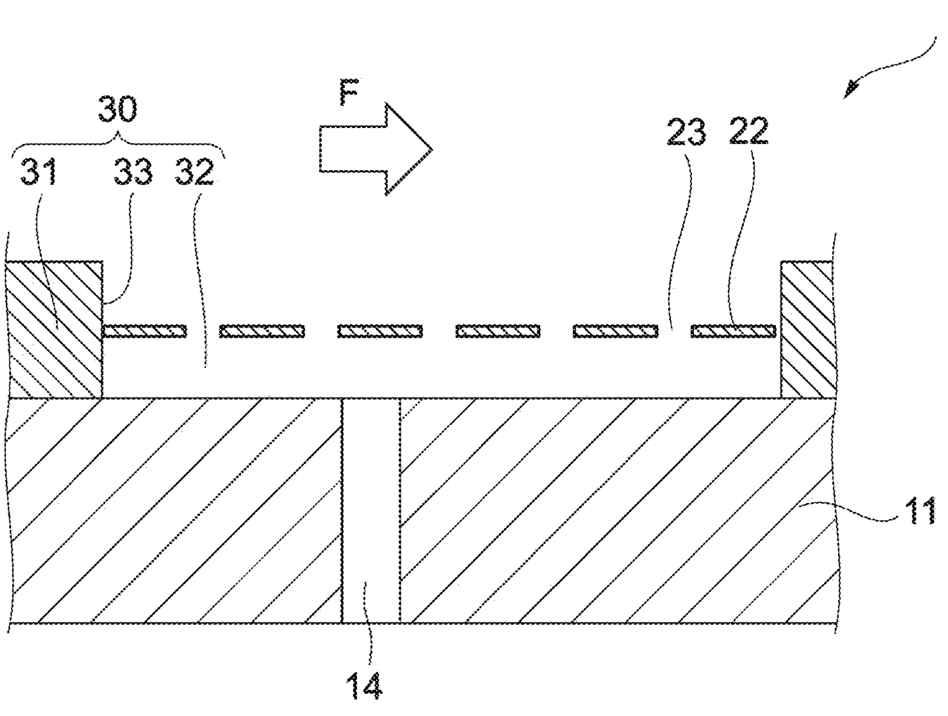
FIG. 3 shows an arrangement of a thin film according to another embodiment.

FIG. 3 shows an arrangement of a thin film according to another embodiment.

In the example of FIG. 28, the thin film 20 is disposed on the surface of the partition member 30, but it is not limited thereto. A thin film 22 including a plurality of small holes 23 only needs to be disposed on the partition member 30 so as to cover the spaces 32 while being away from the perforated member 11. For example, the thin film 22 may be disposed on a side surface 33 (inner surface that faces the space 32) of the partition wall 31 of the partition member 30. In short, if the space 32 can be provided between the surface of the perforated member 11 and the thin film 20, the position of the thin film 20 is not limited, and a high degree of freedom is provided.

The thin film 20 is not attached to a surface brought into direct contact with the Grazing flow (a surface flush with the surface of the partition wall 31), and the thin film 22 is disposed only in the middle between the above-mentioned surface and the surface of the perforated member 11 (the side surface 33 of the partition wall 31). Since the Grazing flow peels at the front edge (boundary with the space 32) in the main flow F direction of the partition wall 31 of the partition member 30, and a direct interference with the thin film 22 is mitigated, and thus it is expected that the thin film 22 provided to only the side surface 33 of the partition wall 31 effectively transmits sounds.

Figure 4:
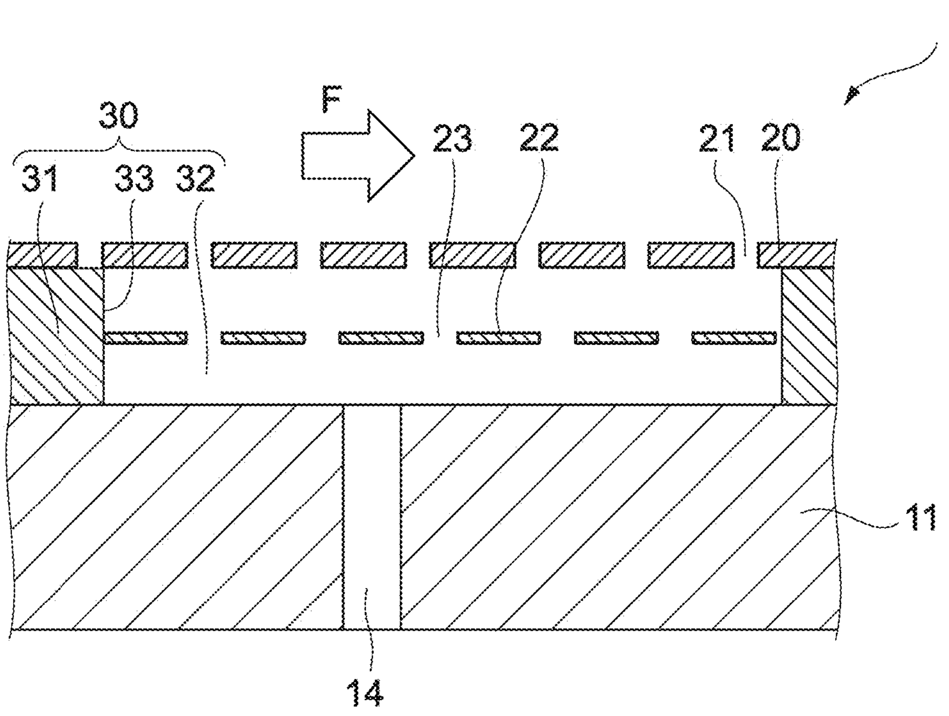
FIG. 4 shows an arrangement of a thin film according to another embodiment.

FIG. 4 shows an arrangement of a thin film according to another embodiment.

A plurality of thin films may be provided. The plurality of thin films include a first thin film 20 and a second thin film 22. The first thin film 20 and the second thin film 22 are each disposed on the partition member 30 so as to cover the spaces 32 while being away from the perforated member 11. The first thin film 20 is disposed on a surface of the partition member 30. The second thin film 22 is disposed on the side surface 33 of the partition wall 31 of the partition member 30. In other words, the first thin film 20 is located on the front surface side (outer side), and the second thin film 22 is located on the inner side. Typically, the first thin film 20 and the second thin film 22 are disposed parallel to the surface of the perforated member 11. The parallel arrangement improves acoustic absorption performance. The first thin film 20 and the second thin film 22 may be disposed to be inclined with respect to the surface of the perforated member 11. The opening ratio of the second thin film 22 by a plurality of small holes 23 perforated in the second thin film 22 is larger than the opening ratio of the first thin film 20 by a plurality of small holes 21 perforated in the first thin film 20.

Figure 5:
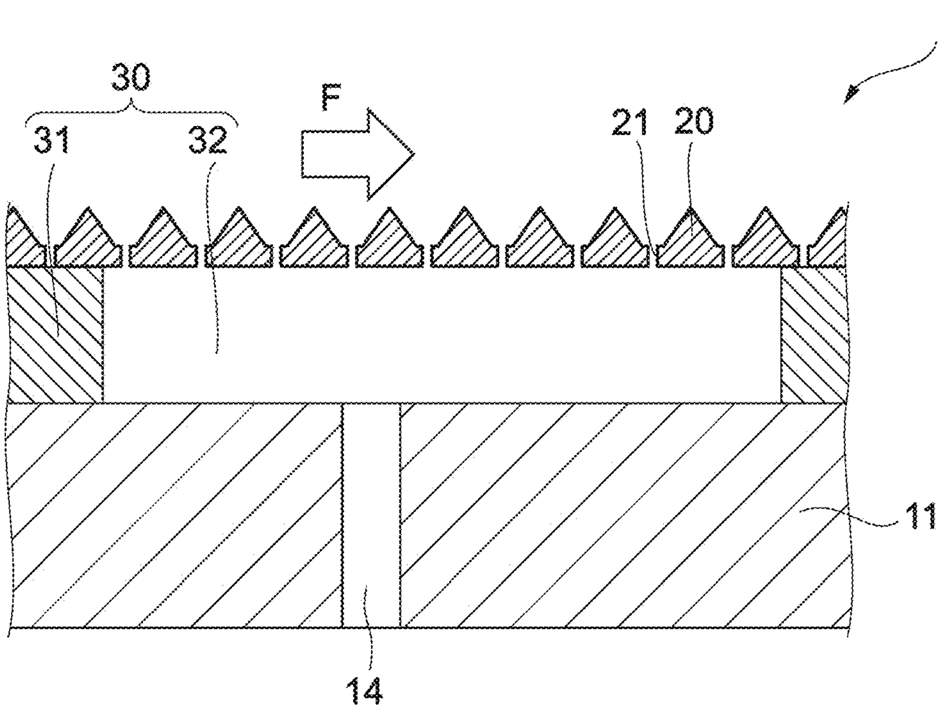
FIG. 5 shows a thin film according to another embodiment.

FIG. 5 shows an arrangement of a thin film according to another embodiment.

A thin film 20 may have an inclined surface with respect to the main flow F direction of the fluid on the surface of the acoustic absorption panel 1. For example, a surface of the thin film 20 may have steps with respect to the main flow F direction. The surface of the thin film 20 may have steps with respect to a direction intersecting with the main flow F direction. The surface of the thin film 20 may have steps with respect to both the main flow F direction and the direction intersecting with the main flow F direction. The shape of the thin film 20 in the thickness direction does not need to be uniform and may be a mountain shape (pyramidal shape) or a wave shape. A plurality of small holes 21 may be disposed in a dimple shape of a golf ball.

The shape of the small hole 21 as viewed from the surface of the thin film 20 is typically circular, but it is not limited thereto and may be rectangular or polygonal, for example. The thin film 20 can have a laminated structure of thin film materials subjected to etching processing. A cross-sectional shape of the small hole 21 as viewed from a direction orthogonal to the surface of the thin film 20 (i.e., the flow path axis of the small hole 21) may be a rectangular shape (straight perforation), a parallelogram shape (oblique perforation), or a trapezoidal shape (tapered perforation). If the cross-sectional shape of the small hole 21 has a trapezoidal shape (tapered perforation), either one of the upper base and the lower base may be a long side.

Although not shown in the figure, the perforated member 11 may have an inclined surface with respect to the thin film 20. In this case, a distance in the depth direction of the space 32 between the surface of the perforated member 11 and the thin film 20 may be disproportionately large on either the upstream side or the downstream side in the main flow F direction of the fluid on the surface of the acoustic absorption panel 1. The depth of the space 32 is different between the upstream side and the downstream side in the main flow F direction, so that it is possible to control the distribution of a sound pressure or a particle velocity and to enhance the acoustic absorption performance. For example, the surface of the perforated member 11 may be inclined such that the depth of the space 32 is larger on the downstream side of the main flow F direction than the upstream side thereof. In this case, the depth of the space 32 is larger on the downstream side of the main flow F direction than the upstream side thereof, so that the sound pressure or particle velocity can be dispersed on the downstream side in which the sound pressure or particle velocity is high.

Figure 6:
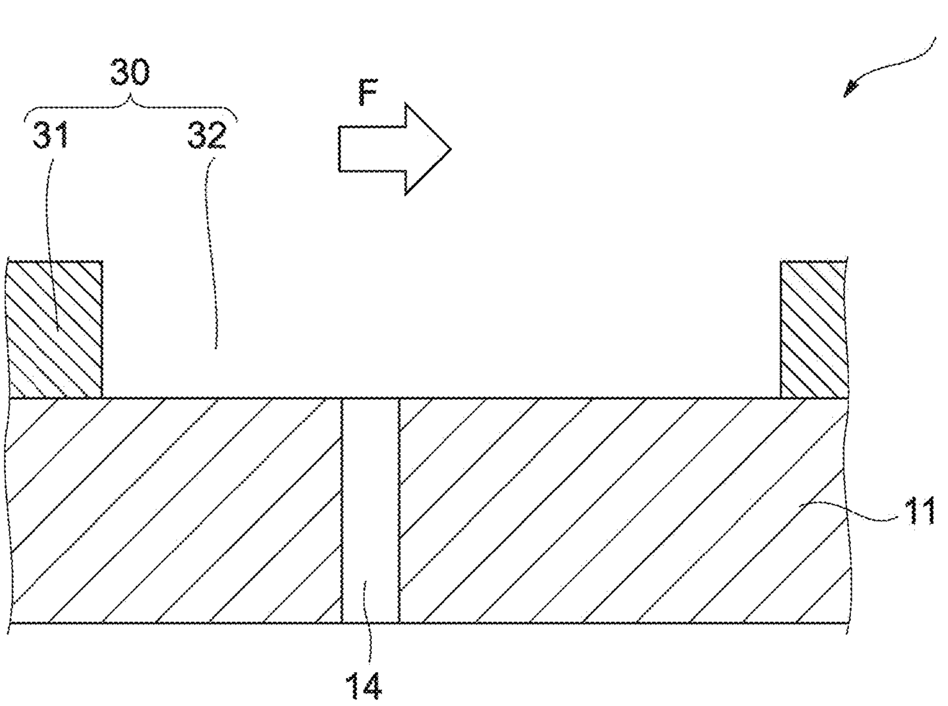
FIG. 6 shows an acoustic absorption panel according to another embodiment.

FIG. 6 shows an acoustic absorption panel according to another embodiment.

An acoustic absorption panel 1 according to another embodiment includes a perforated member 11 and a partition member 30 disposed on a surface of the perforated member 11. In other words, the acoustic absorption panel 1 does not need to include a thin film 20.

Action of Acoustic Absorption Panel

Figure 7:
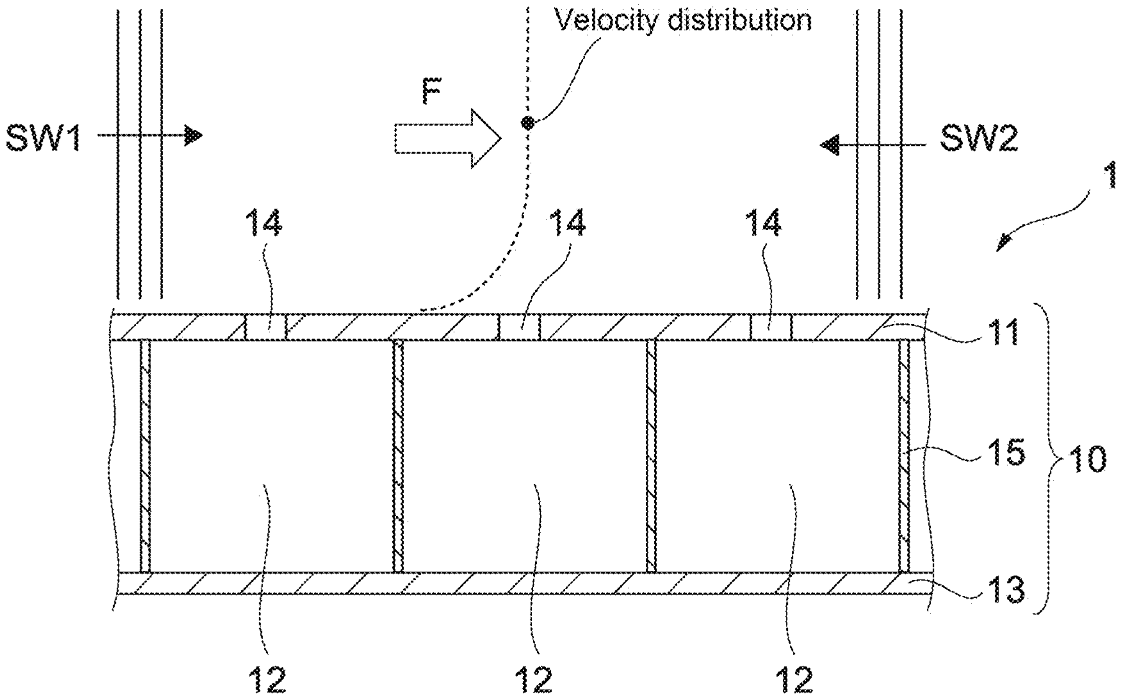
FIG. 7 is a cross-sectional view for describing an action of a general acoustic absorption panel.

FIG. 7 is a cross-sectional view for describing the action of a general acoustic absorption panel.

If an airflow (Grazing flow) is present on a surface of an acoustic absorption panel 1' (without the thin film 20 and the partition member 30 including the space 32), this main flow F forms a boundary layer in the vicinity of the surface of the acoustic absorption panel 1' and is under the condition having zero velocity on the surface. Further, there are a sound wave SW1 propagating in the same direction as the main flow F and a sound wave SW2 propagating in the opposite direction. It is assumed that the wavelengths of the sound waves SW1 and SW2 are larger than the dimension of the cell 12 of the acoustic absorption panel 1', and the sound waves SW1 and SW2 are set to be targets for acoustic absorption. When the sound waves SW1 and SW2 pass through the vacancies of the holes 14 of the acoustic absorption panel 1', the pressure is transmitted from the holes 14 to the inside of the cells 12, and air layers of the holes 14 fluctuate, with the result that the sound waves SW1 and SW2 are absorbed. It is also reported that the sound-wave absorption mechanism has types depending on the sound pressures.

Figure 8:
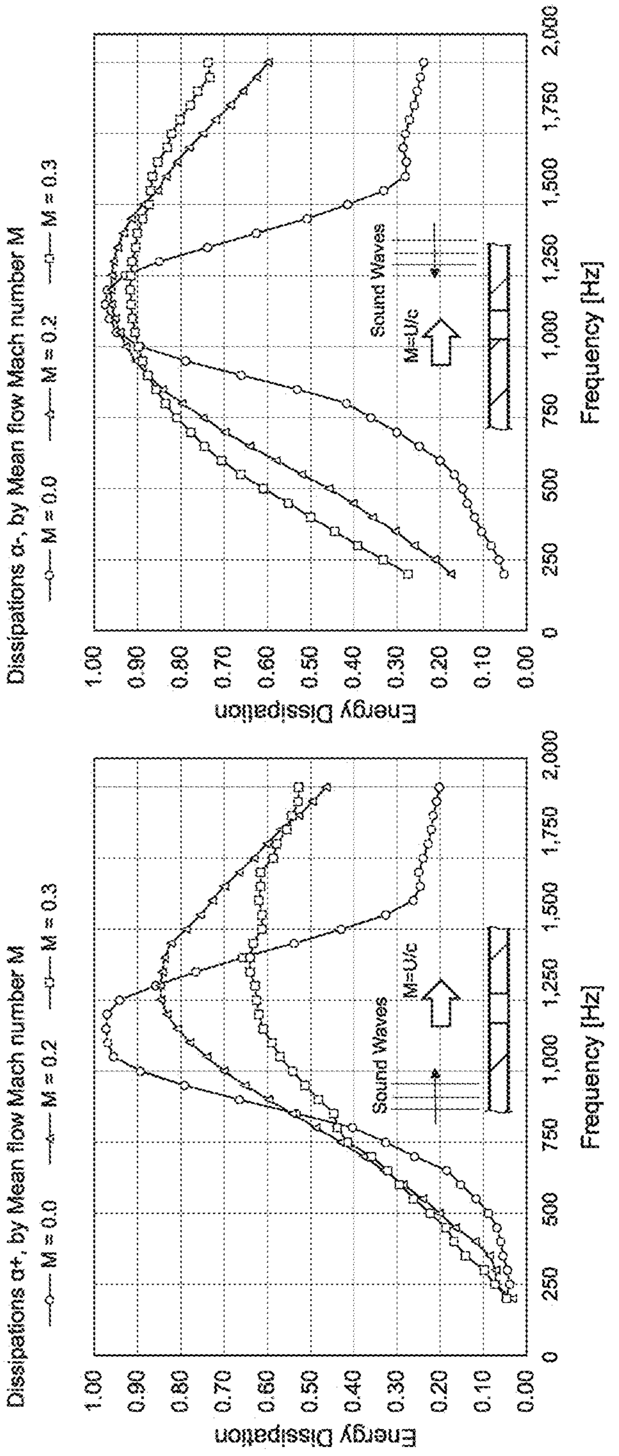
FIG. 8 shows graphs of results obtained by measuring a change in acoustic absorption coefficient by a Grazing flow in the acoustic absorption panel to which the thin film is not attached.

FIG. 8 shows results obtained by measuring a change in acoustic absorption coefficient of the acoustic absorption panel main body, to which the thin film 20 is not attached (without the thin film 20 and the partition member 30 including the spaces 32), (which has the size of 60 mm width by 280 mm length, installed on the entire surface of a duct (with cross-section of 60 mm by 80 mm)), by the Grazing flow (indicating the Mach number (M=U/c) obtained by dividing a velocity U by a sound velocity c in the duct).

The left diagram shows the acoustic absorption coefficient in the same direction as the main flow, and the right diagram shows the acoustic absorption coefficient in the direction opposite to the main flow. The propagation against the main flow is in line with a sensory tendency in which it is difficult for sounds to be transmitted. If there is no Grazing flow, there are no significant differences between the propagation directions (open circles). From the above results, it is found that there are three characteristics of the Grazing flow as follows.

(1) As the Grazing flow velocity increases, a resonant frequency (frequency at which the acoustic absorption coefficient has a peak) increases in a direction along the main flow.

(2) As the Grazing flow velocity increases, a local maximal value of the acoustic absorption coefficient (hereinafter, also referred to as "peak acoustic absorption coefficient") decreases as compared to the case where there is no Grazing flow. In the direction along the main flow, the local maximal value decreases by approximately 40%, visually from 0.96 to 0.6. This example corresponds to a case where the acoustic absorption panel is installed on a bypass exhaust duct of a jet engine.

(3) As the Grazing flow velocity increases, the tendency to increase a broadband acoustic absorption coefficient is exhibited. However, this does not meet the original design value, and in addition, this broadband effect is limitative in the main flow direction.

Figure 9A:
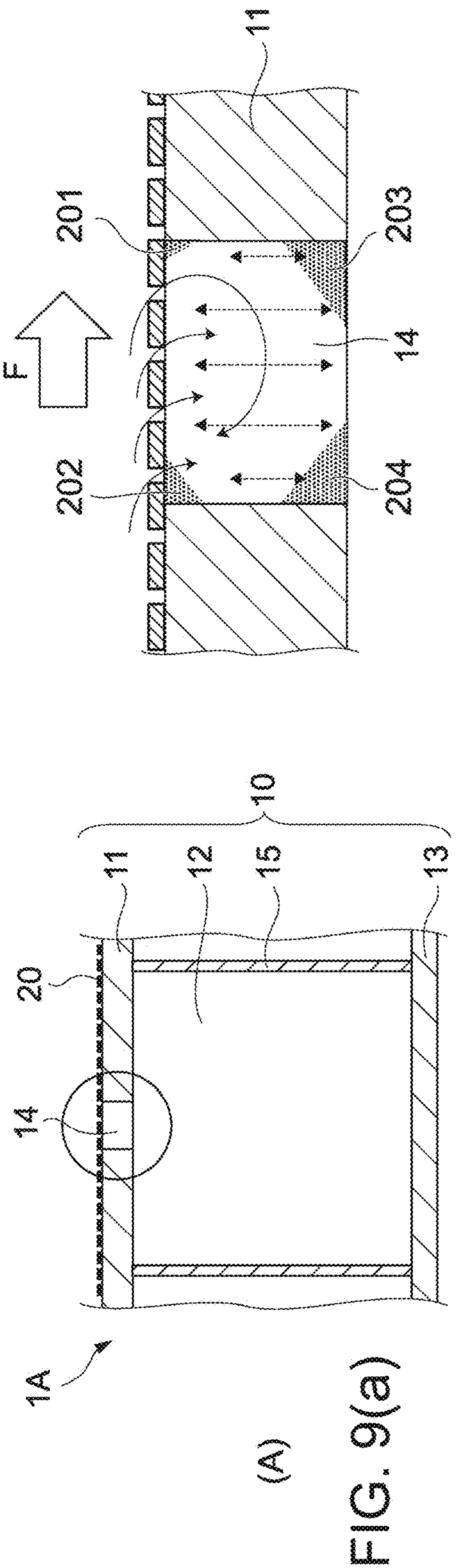
FIGS. 9(*a*) and 9(*b*) schematically show an action expected for the acoustic absorption panel of this embodiment.
Figure 9B:
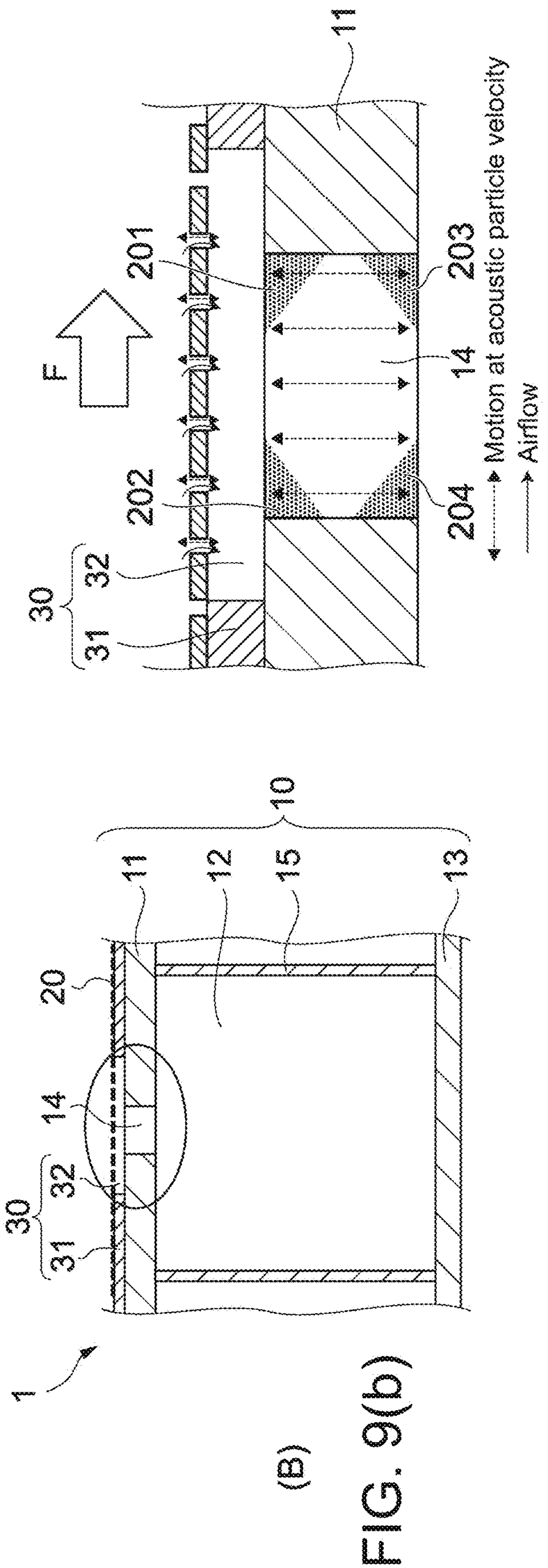

FIGS. 9(*a*) and 9(*b*) schematically show actions expected in the acoustic absorption panel of this embodiment.

The left diagram on the upper row (A) shows an acoustic absorption panel 1A according to a comparative example in which the thin film 20 is directly disposed on a surface of the perforated member 11. The right diagram on the upper row (A) is an enlarged view of the vicinity of the hole 14 (portion surrounded by the circle). The left diagram on the lower row (B) shows the acoustic absorption panel 1 according to this embodiment in which the partition member 30 including the space 32 is disposed between the perforated member 11 and the thin film 20. The right diagram on the lower row (B) is an enlarged view of the vicinity of the hole 14 (portion surrounded by the ellipse). The arrow of a solid line represents an airflow, and the arrow of a broken line represents the motion at an acoustic particle velocity.

With the acoustic absorption panel 1A according to the comparative example (A), the airflow (Grazing flow) flows in the hole 14 of the perforated member 11 from the small holes 21 of the thin film 20. The entrainment of the airflow flowing in from the small holes 21 of the thin film 20 remains on the thin film 20 side within the hole 14 of the perforated member 11. Since the entrainment of the airflow remains, energy dissipation is insufficient at edges 201 and 202 (particularly at the downstream edge 201) on the thin film 20 side within the hole 14 of the perforated member 11, the acoustic particle velocity is insufficient, and the acoustic absorption coefficient is reduced. On the other hand, if the plate thickness of the perforated member 11 is large, energy dissipates sufficiently at lower edges 203 and 204 in the hole 14 of the perforated member 11. However, if the plate thickness of the perforated member 11 is small or if the airflow velocity is slow, the entrainment of the airflow flowing in from the small holes 21 of the thin film 20 remains in the hole 14, and thus energy dissipation is also insufficient at the edges 203 and 204, and the acoustic absorption coefficient is reduced.

In contrast to the above panel, with the acoustic absorption panel 1 (B) according to this embodiment, the airflow (Grazing flow) flows in the space 32 from the small holes 21 of the thin film 20. In other words, the airflow does not directly flow in the hole 14 of the perforated member 11 from the small holes 21 of the thin film 20. The airflow flows in the hole 14 of the perforated member 11 from the space 32. As a result, the acoustic particle velocity within the hole 14 maintains one dimensional property, and the motion at the particle velocity in the hole 14 is accelerated, and a high internal pressure state in the cell 12 is maintained. Even if the plate thickness of the perforated member 11 is small, the entrainment of the airflow flowing in from the small holes 21 of the thin film 20 hardly remains in the hole 14, and thus energy dissipates sufficiently at the edges 201, 202, 203, and 204 in the hole 14, and the acoustic absorption effect is maintained depending on the condition of the Grazing flow. Even if the Grazing flow is present, the acoustic absorption coefficient equivalent to that in a stationary field is obtained.

In the acoustic absorption panel 1 according to this embodiment, the partition member 30 including the space 32 is disposed between the perforated member 11 and the thin film 20, so that it is possible to suppress a decrease in acoustic absorption coefficient or a shift of the resonant frequency when the airflow (Grazing flow) is present on the surface, and to improve the acoustic performance as compared to the comparative example. The inventors of the present invention performed the following experiments in order to confirm such effects. Note that in some experimental examples, the acoustic absorption panel 1' without the thin film 20 and the partition member 30 including the spaces 32 was used for comparison with the acoustic absorption panel 1 according to this embodiment.

EXPERIMENTAL EXAMPLES

Figure 10:
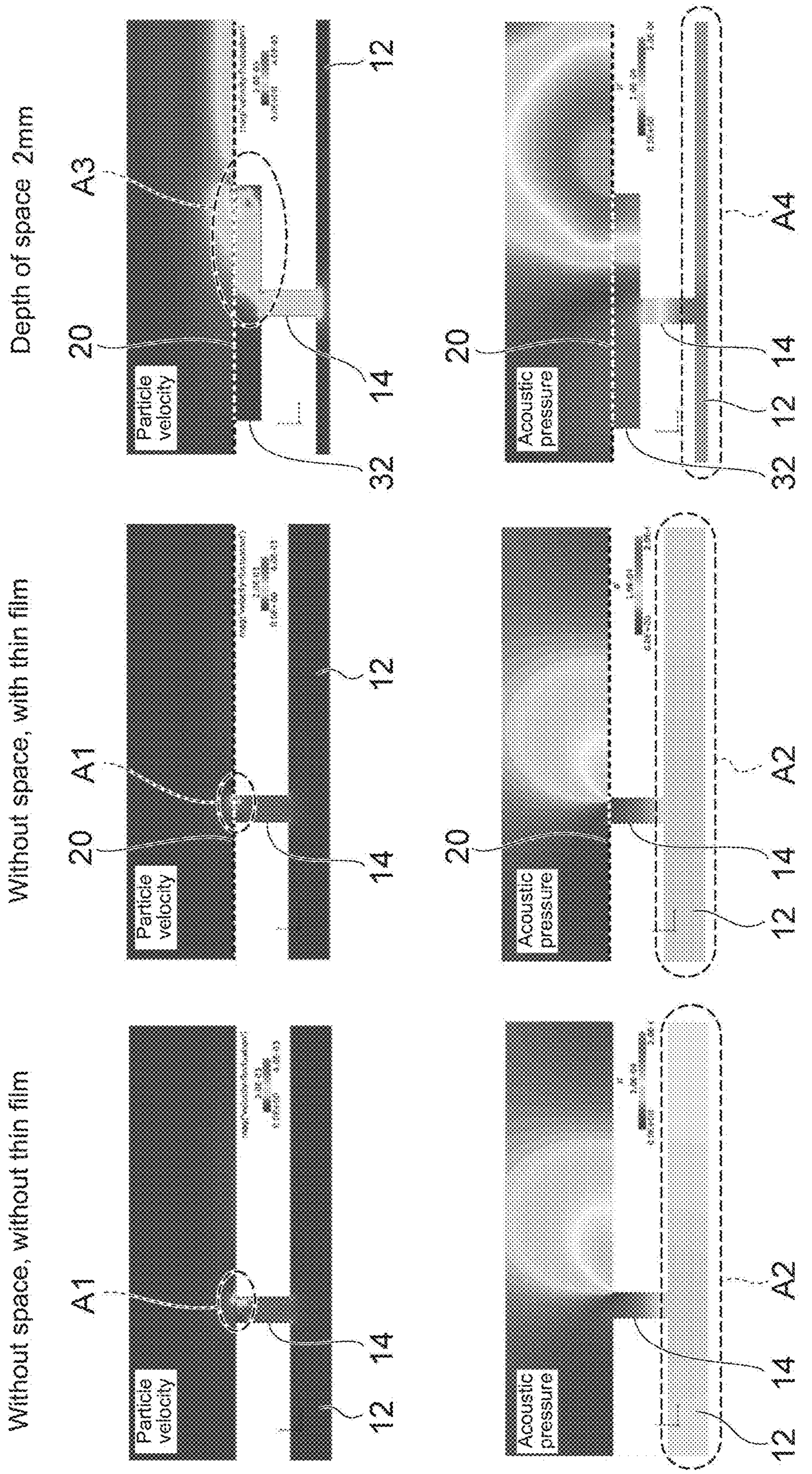
FIG. 10 shows Experimental example 1.

FIG. 10 shows Experimental example 1.

As a test piece of this embodiment, an acoustic absorption panel 1 was prepared, in which the hole diameter of the hole 14 of the perforated member 11 is 1.9 mm, the hole length thereof is 4 mm, the depth of the space 32 of the partition member 30 is 2 mm, the hole diameter of the small hole 21 of the thin film 20 is 0.19 mm, the film thickness is 0.19 mm, and the opening ratio is 30%. As a comparative example, an acoustic absorption panel that does not include the partition member 30 including the spaces 32 and the thin film 20 and that has the same parameters (that is, includes only the acoustic absorption panel main body 10) was prepared. As another comparative example, an acoustic absorption panel that does not include the partition member 30 including the spaces 32, includes the thin film 20 directly attached to the surface of the perforated member 11, and has the same parameters was prepared. In any case, the flow path height on the surface of the acoustic absorption panel is 80 mm. The Grazing flow has an average Mach number of 0.3 (to 100 m/s to 360 km/h), and the main flow direction is a direction from left to right in the figure. Sound having a resonant frequency of 948 Hz with the cell 12 and a sound pressure of 110 dB propagates from left to right in the figure.

In each comparative example (with the acoustic absorption panel main body 10 alone, without the partition member 30 including the spaces 32), the particle velocity at the opening of the hole 14 of the perforated member 11 is not uniform (A1 in the figure), and the internal pressure of the cell 12 does not rise (A2 in the figure). In contrast, with the space 32, the entrainment of the Grazing flow moves to the downstream end of the space 32 (A3 in the figure), so that the particle velocity at the opening of the hole 14 of the perforated member 11 becomes uniform, and the internal pressure of the cell 12 rises (A4 in the figure). From the above, it is conceivable that the presence of the space 32 increases the amplitude of the particle velocity of the hole 14 of the perforated member 11, increases energy dissipation, and increases the acoustic absorption coefficient.

Figure 11:
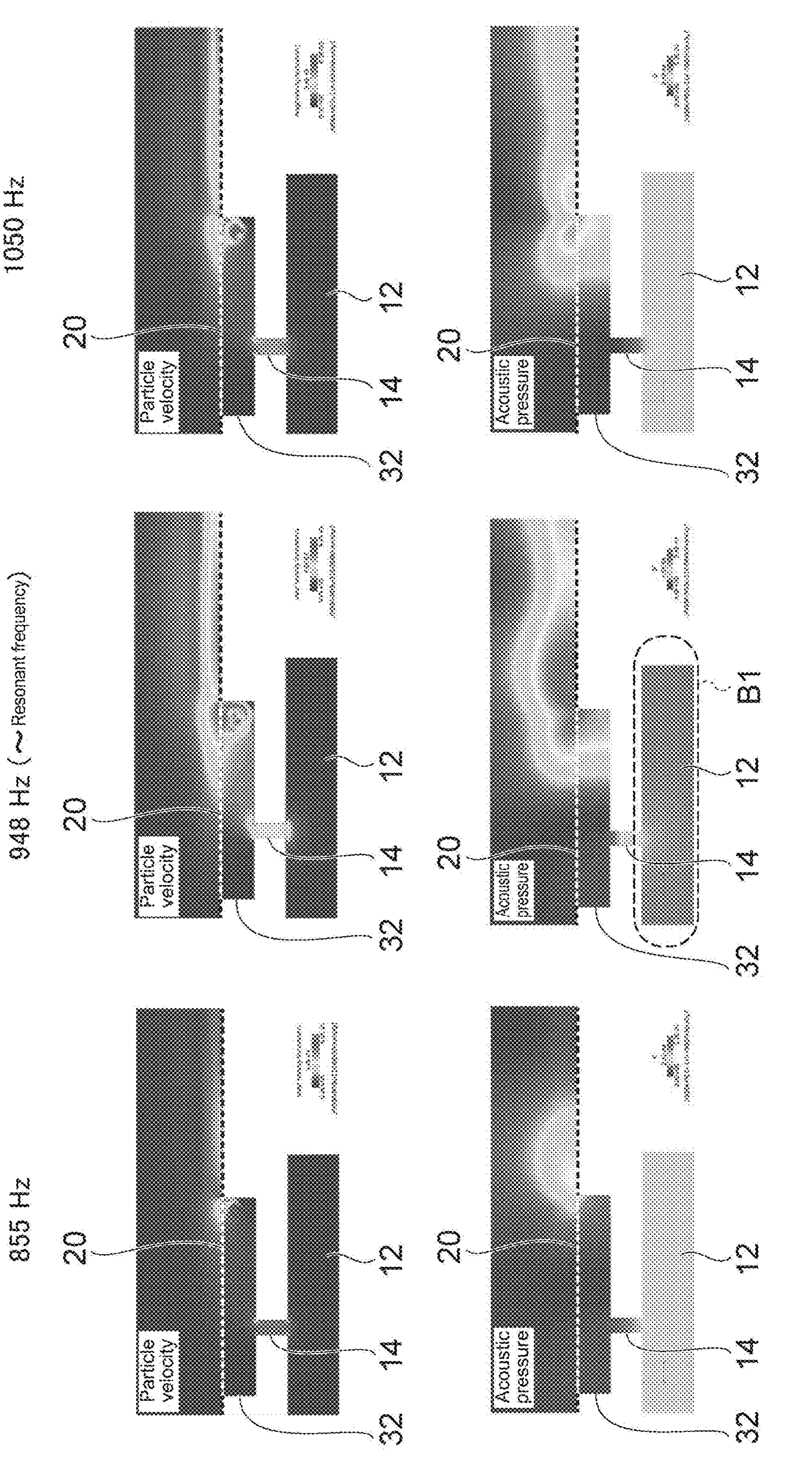
FIG. 11 shows Experimental example 2.

FIG. 11 shows Experimental example 2.

As a test piece of this embodiment, an acoustic absorption panel 1 was prepared, in which the hole diameter of the hole 14 of the perforated member 11 is 1.9 mm, the hole length thereof is 4 mm, the depth of the space 32 of the partition member 30 is 4 mm, the hole diameter of the small hole 21 of the thin film 20 is 0.19 mm, the film thickness is 0.19 mm, and the opening ratio is 30%. In any case, the flow path height on the surface of the acoustic absorption panel is 80 mm. The Grazing flow has an average Mach number of 0.3

(to 100 m/s to 360 km/h), and the main flow direction is a direction from left to right in the figure.

The frequency was changed to 855 Hz, 948 Hz (resonant frequency), and 1050 Hz. The internal pressure of the cell 12 was maximum at the frequency of 948 Hz (resonant frequency) (B1 in the figure), and the Grazing flow was suppressed from running around by the space 32. According to such an acoustic absorption panel 1 (with the partition member 30), the original effect of restoring the functions of the hole 14 and the cell 12, which is lost by the Grazing flow, is exhibited.

Figure 12:
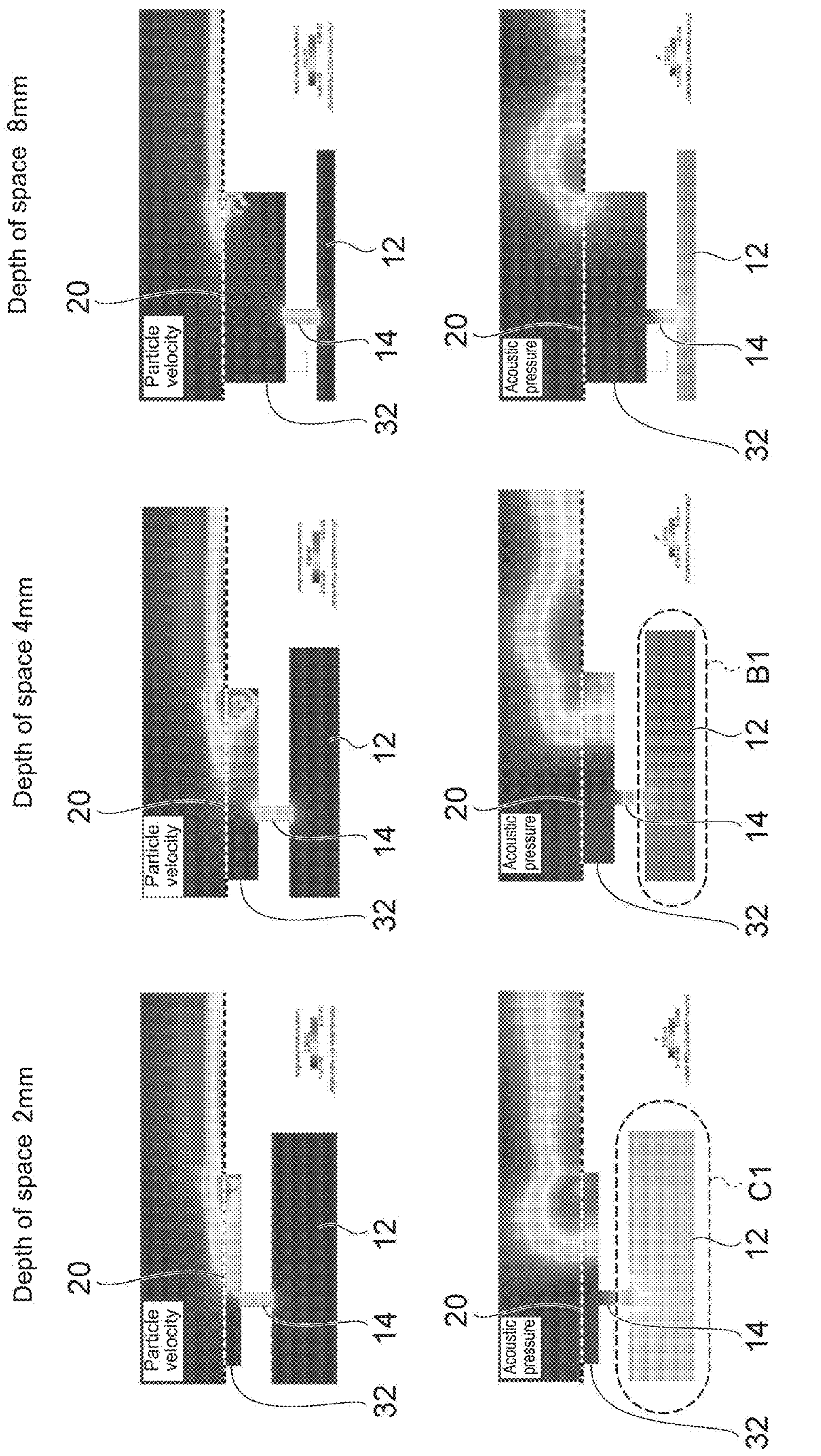
FIG. 12 shows Experimental example 3.

FIG. 12 shows Experimental example 3.

As test pieces of this embodiment, three types of the acoustic absorption panel 1 having different depths (2 mm, 4 mm, and 8 mm) of the space 32 of the partition member 30 were prepared. The other conditions of the three types of the acoustic absorption panel 1 are equal, in which the hole diameter of the hole 14 of the perforated member 11 is 1.9 mm, the hole length thereof is 4 mm, the hole diameter of the small hole 21 of the thin film 20 is 0.19 mm, the film thickness is 0.19 mm, and the opening ratio is 30%. In any case, the flow path height on the surface of the acoustic absorption panel is 80 mm. The Grazing flow has an average Mach number of 0.3 (to 100 m/s to 360 km/h), and the main flow direction is a direction from left to right in the figure. Sound having a resonant frequency of 948 Hz with the cell 12 and a sound pressure of 110 dB propagates from left to right in the figure.

If the depth of the space 32 between the thin film 20 and the perforated member 11 is small, the Grazing flow affects the opening of the hole 14 of the perforated member 11, and the internal pressure of the cell 12 decreases (Cl in the figure). This suggests that the depth of the space 32 to enhance the acoustic absorption coefficient may have a lower limit threshold.

Figure 13:
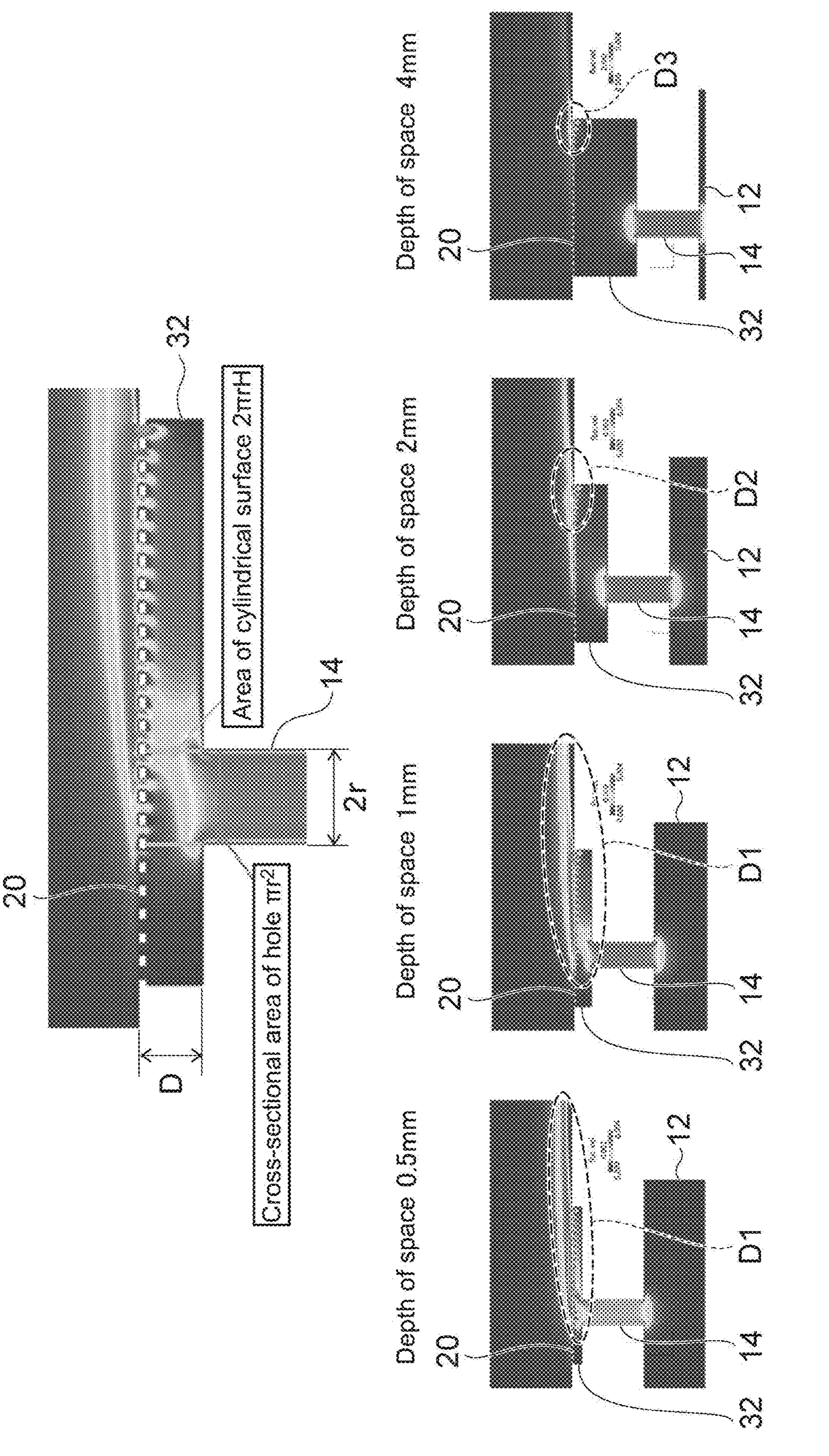
FIG. 13 shows Experimental example 4.

FIG. 13 shows Experimental example 4.

As test pieces of this embodiment, four types of the acoustic absorption panel 1 having different depths (0.5 mm, 1 mm, 2 mm, and 4 mm) of the space 32 of the partition member 30 were prepared. The other conditions of the four types of the acoustic absorption panel 1 are equal, in which the hole diameter of the hole 14 of the perforated member 11 is 1.9 mm, the hole length thereof is 4 mm, the hole diameter of the small hole 21 of the thin film 20 is 0.26 mm, the film thickness is 0.15 mm, and the opening ratio is 30%. In any case, the flow path height on the surface of the acoustic absorption panel is 80 mm. The Grazing flow has an average Mach number of 0.3 (to 100 m/s to 360 km/h), and the main flow direction is a direction from left to right in the figure. Sound having a resonant frequency of 812 Hz with the cell 12 propagates from left to right in the figure. The distribution of the airflow velocity is three-dimensionally analyzed.

Assuming that the radius of the hole 14 of the perforated member 11 is r and the depth of the space 32 is H, the cross-sectional area of the hole 14 is πr2, and the superficial area of the cylindrical surface virtually extending from the upper end of the hole 14 to the space 32 is 2πrH.

If the depth of the space 32 is 0.5 mm and 1 mm, a region in which the airflow velocity on the surface of the thin film 20 is high extends largely in the downstream direction from the hole 14 of the perforated member 11 (D1 in the figure). Meanwhile, if the depth of the space 32 is 2 mm, the region in which the airflow velocity on the surface of the thin film 20 is high is narrow to a large extent, and is spaced away from the hole 14 of the perforated member 11 (D2 in the figure), that is, the influence of the airflow on the opening of the hole 14 is reduced. If the depth of the space 32 is 4 mm, the region in which the airflow velocity on the surface of the thin film 20 is high is narrower, and is further spaced away from the hole 14 of the perforated member 11 (D3 in the figure), that is, the influence of the airflow on the opening of the hole 14 is further reduced. From the above, the depth of the space 32 is favorably larger than the diameter of the hole 14 of the perforated member 11, and more favorably larger than twice the diameter of the hole 14.

Figure 14:
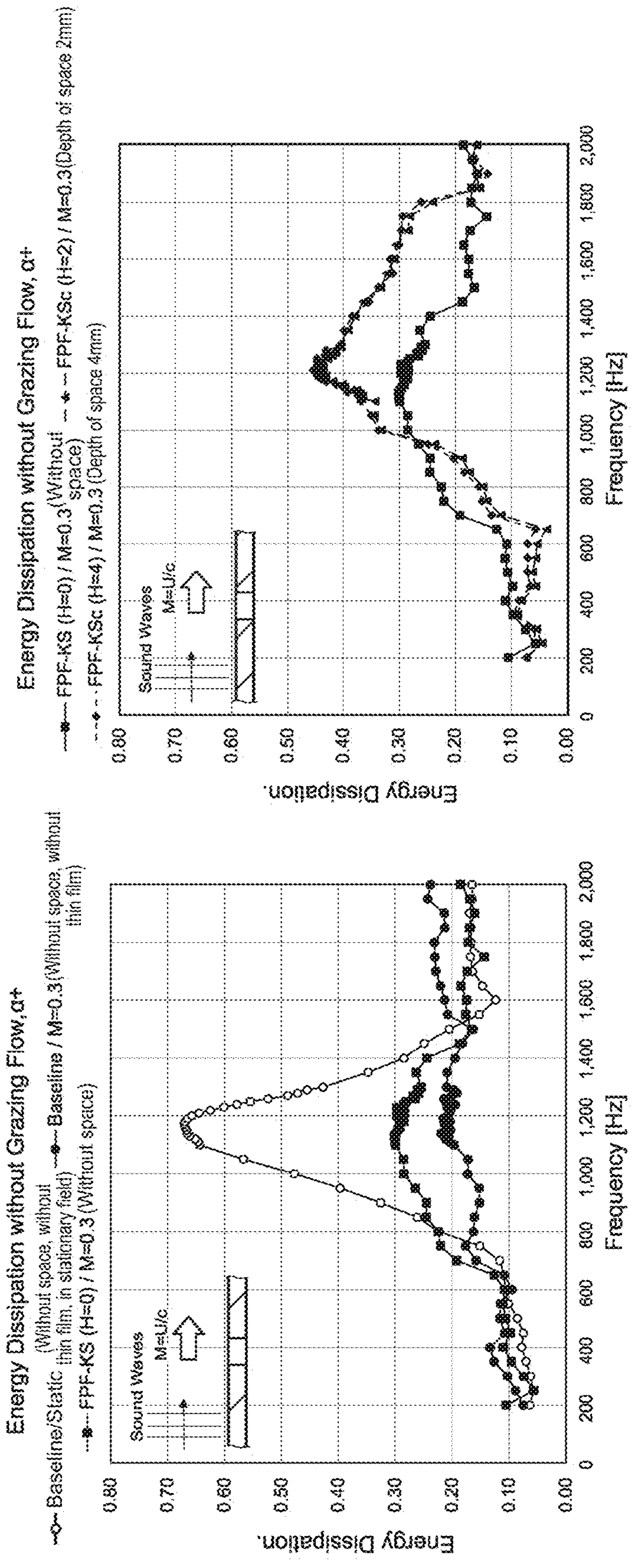
FIG. 14 shows Experimental example 5.

FIG. 14 shows Experimental example 5.

As test pieces of this embodiment, two types of the acoustic absorption panel 1 having different depths (H=2 mm, H=4 mm) of the space 32 of the partition member 30 were prepared as shown in the right part of the figure. The other conditions of the two types of the acoustic absorption panel 1 are equal, in which the hole diameter of the hole 14 of the perforated member 11 is 1 mm, five holes are provided per cell, the thickness of the perforated member 11 is 1 mm, and the opening ratio is 3% or below. The size of the cell 12 is 12 mm by 16 mm by 30 mm (w1×w2×h). As a comparative example, as shown in the left part of the figure, an acoustic absorption panel that does not include the partition member 30 including the spaces 32 (H=0 mm), includes the thin film 20 directly attached to the surface of the perforated member 11, and has the same parameters was prepared. As another comparative example, an acoustic absorption panel that does not include the partition member 30 including the spaces 32 and the thin film 20 (that is, includes only the acoustic absorption panel main body 10) was prepared (Baseline). The acoustic absorption coefficient (in the description of the figure, Energy Dissipation) of the sound waves in the same direction (α+) as the Grazing flow (Mach number M=0.3) was measured.

The definitional equation of the acoustic absorption coefficient (Energy Dissipation) will be described below. In the Energy Dissipation (a), sounds propagating in the same direction as the main flow is identified as +, and sounds propagating in the opposite direction is identified as −, to obtain a dissipation rate of each direction.

$$\alpha_{\pm} = 1 - \frac{(1 \mp M)^2}{(1 \pm M)^2}|r_{\pm}|^2 - |t_{\pm}|^2 \quad \text{[Math. 1]}$$

In the mathematical expression 1, M represents a "main flow" Mach number. r represents a reflectance of a complex amplitude when sound waves enter an acoustic absorption wall portion, and the direction is defined as described above. t represents a transmittance of a complex amplitude when sound waves enter an acoustic absorption wall portion, and the direction is defined as described above. Note that a, r, and t are all complex numbers and are functions of frequency.

$$\alpha=\alpha(f)$$

r and t are calculated from the following linear equation.

$$\begin{bmatrix} p_{u,-} \\ p_{d,+} \end{bmatrix} = \begin{bmatrix} r_+ & t_- \\ t_+ & r_- \end{bmatrix} \begin{bmatrix} p_{u,+} \\ p_{d,-} \end{bmatrix} \quad \text{[Math. 2]}$$

In the mathematical expression 2, pu and pd are traveling waves or reflected waves on the upstream and the downstream of an acoustic absorption wall portion, respectively. pu and pd are all functions of frequency and complex numbers. Using reception signals of microphone groups (in multiple number of pieces, e.g., seven each, located in special positions) on the upstream and downstream of the acoustic absorption wall and input signals of a sound source, the complex amplitude is calculated from the linear equation.

As shown in the left part of the figure, the peak of the acoustic absorption coefficient without the space 32 and the thin film 20 (Baseline) was 0.22, the peak of the acoustic absorption coefficient without the space 32 (H=0 mm) was 0.3, and the peak of the acoustic absorption coefficient of the test pieces (H=2 mm, H=4 mm) was 0.45. As shown in the right part of the figure, the peak of the acoustic absorption coefficient of the test pieces (H=2 mm, H=4 mm) was increased by twice or more and decreased by 3 dB or more (10*log(0.45/0.22)=3.10) as compared to the case without the space 32 and the thin film 20 (Baseline). The peak of the acoustic absorption coefficient of the test pieces (H=2 mm, H=4 mm) was increased by approximately 50% as compared to the case without the space 32 (H=0 mm). From the above, providing the space 32 and the thin film 20 increases the acoustic absorption coefficient of the sound waves in the same direction as the Grazing flow, as compared to the case without the space 32 and the thin film 20 (Baseline) and the case without the space 32 (H=0 mm).

Figure 15:
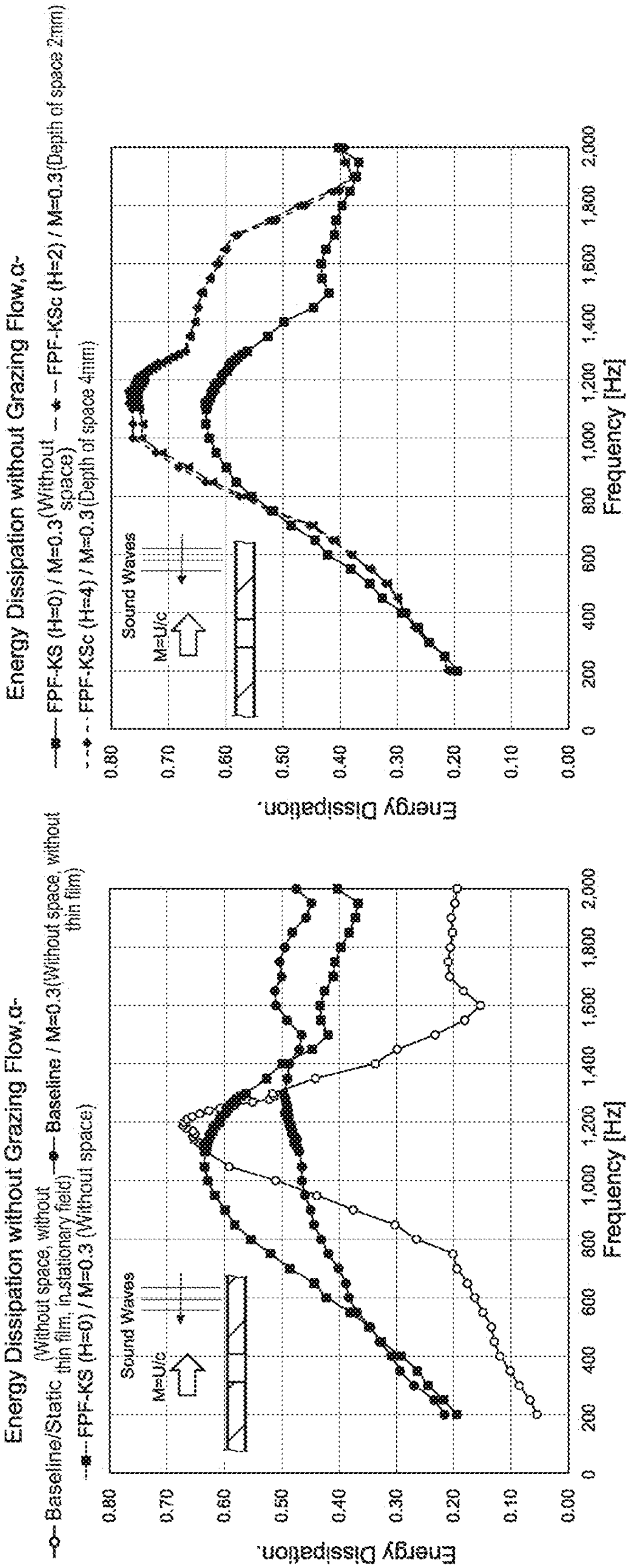
FIG. 15 shows Experimental example 6.

FIG. 15 shows Experimental example 6.

A difference from Experimental example 5 is that the acoustic absorption coefficient of the sound waves in the opposite direction (α−) of the Grazing flow (Mach number M=0.3) was measured.

The peak of the acoustic absorption coefficient without the space 32 and the thin film 20 (Baseline) was 0.5, the peak of the acoustic absorption coefficient without the space 32 (H=0 mm) was 0.63, and the peak of the acoustic absorption coefficient of the test pieces (H=2 mm, H=4 mm) was 0.75 or more. The peak of the acoustic absorption coefficient of the test pieces (H=2 mm, H=4 mm) was increased by approximately 50% as compared to the case without the space 32 and the thin film 20 (Baseline). The peak of the acoustic absorption coefficient of the test pieces (H=2 mm, H=4 mm) was increased by approximately 20% as compared to the case without the space 32 (H=0 mm). From the above, providing the space 32 and the thin film 20 increases the acoustic absorption coefficient of the sound waves in the opposite direction of the Grazing flow, as compared to the case without the space 32 and the thin film 20 (Baseline) and the case without the space 32 (H=0 mm).

Figure 16:
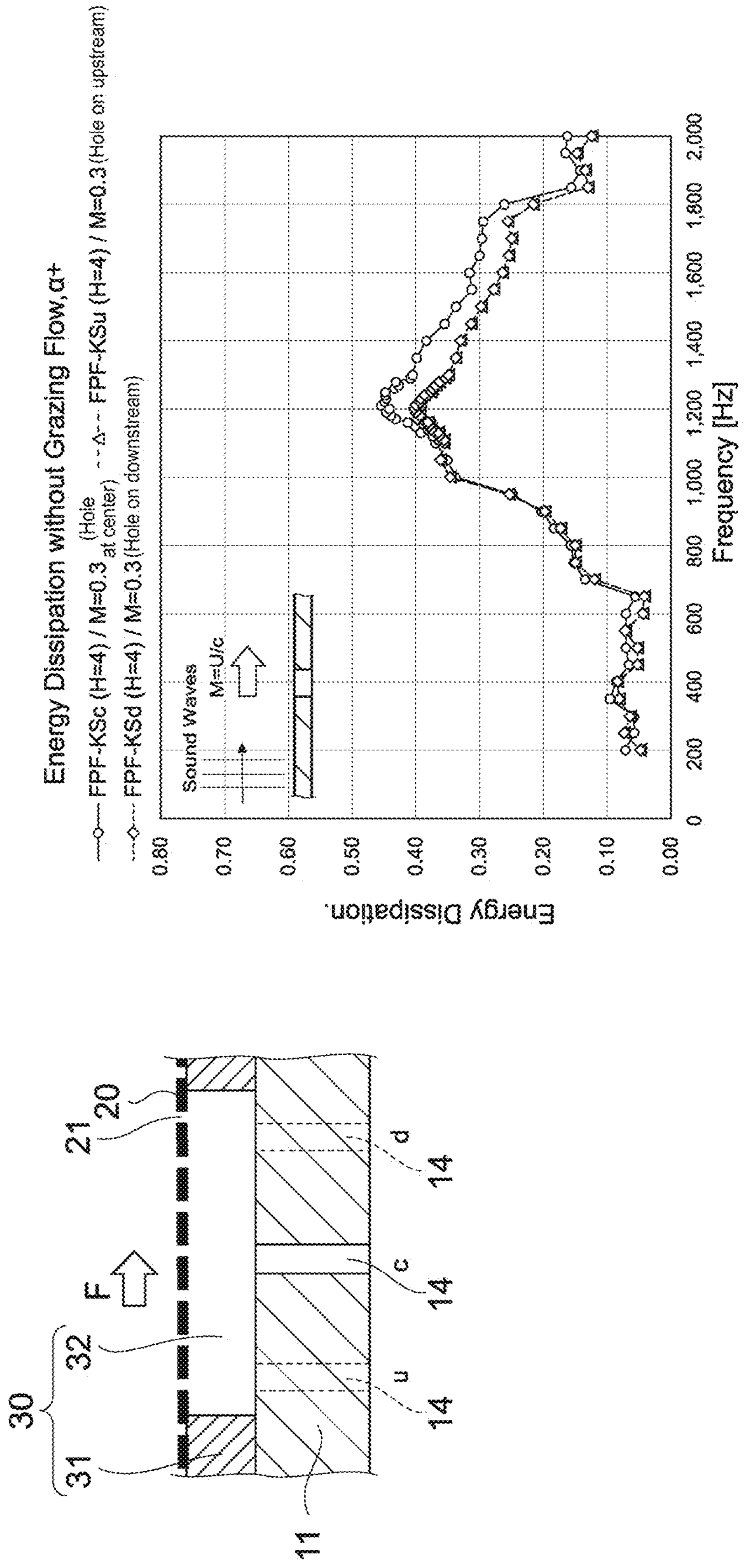
FIG. 16 shows Experimental example 7.

FIG. 16 shows Experimental example 7.

As test pieces of this embodiment, three types of the acoustic absorption panel 1 having different positions (center c, upstream u, and downstream d in the main flow F direction) of the hole 14 of the perforated member 11 were prepared. The other conditions of the three types of the acoustic absorption panel 1 are equal, in which the hole diameter of the hole 14 of the perforated member 11 is 1 mm, five holes are provided per cell, the thickness of the perforated member 11 is 1 mm, the opening ratio is 3% or below, and the depth of the space 32 of the partition member 30 is H=4 mm. The size of the cell 12 is 12 mm by 16 mm by 30 mm (w1×w2×h). The acoustic absorption coefficient of the sound waves in the same direction (α+) as the Grazing flow (Mach number M=0.3) was measured.

In the range of the space 32, when the hole 14 of the perforated member 11 is present at the center c in the main flow F direction, the acoustic absorption coefficient is highest. Meanwhile, when the hole 14 of the perforated member 11 is present on the upstream u or the downstream d in the main flow F direction, the acoustic absorption coefficient is relatively low. This tendency also applies to the case where the sound waves propagate in the opposite direction (α−) of the Grazing flow.

Figure 17:
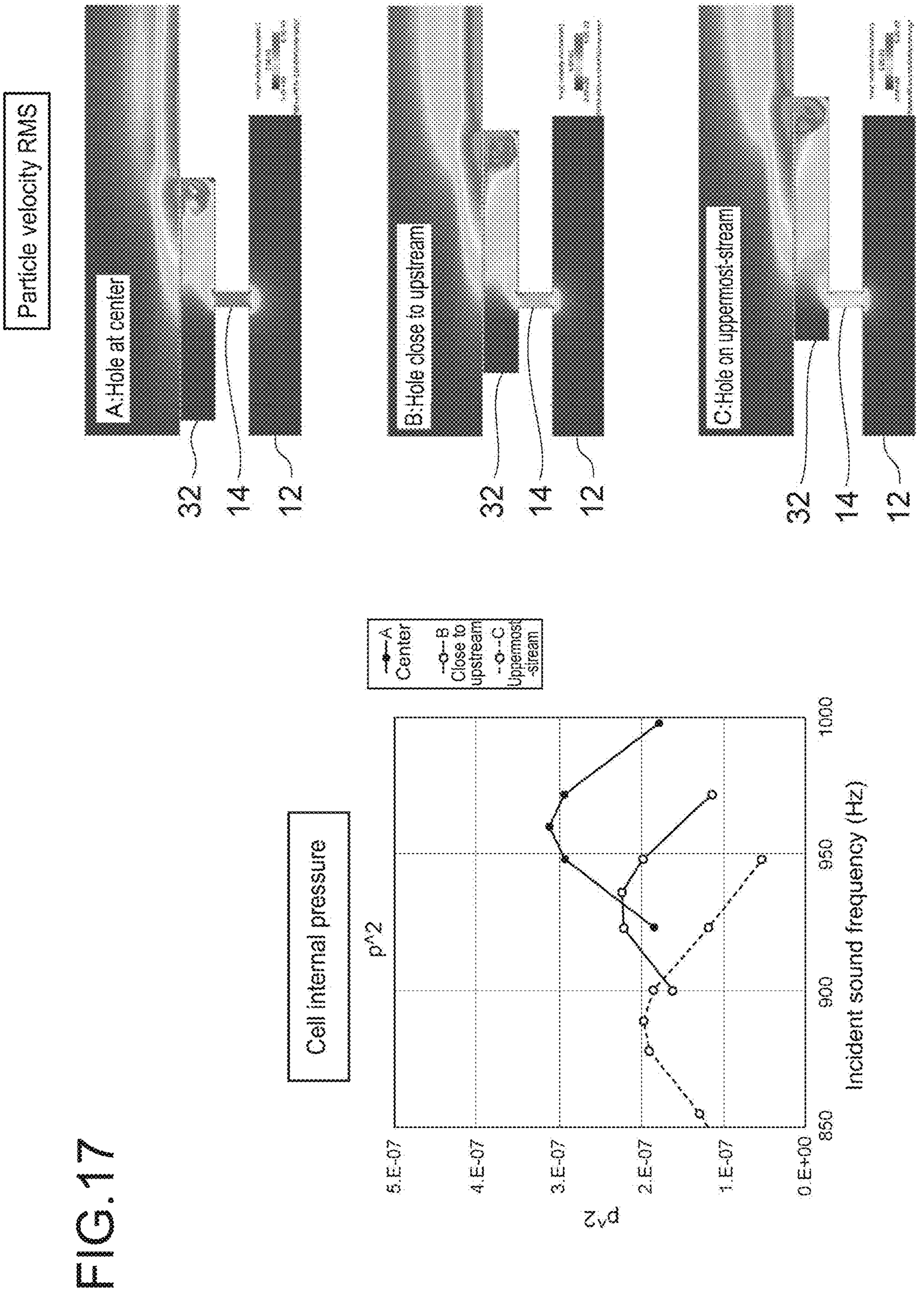
FIG. 17 shows Experimental example 8.

FIG. 17 shows Experimental example 8.

As test pieces of this embodiment, three types of the acoustic absorption panel 1 having different positions (center A, close to the upstream B, and uppermost-stream C in the main flow F direction) of the hole 14 of the perforated member 11 were prepared. The other conditions of the three types of the acoustic absorption panel 1 are equal.

In numerical analyses, the internal pressures of the cell 12 obtained when the position of the hole 14 was changed were compared to evaluate the magnitude of the acoustic absorption coefficient. This is because the internal pressure and the acoustic particle velocity amplitude (correlating with dissipation amount) correlate with each other. It was verified that the acoustic absorption coefficient is high when the position of the hole 14 is not shifted to the uppermost-stream side of the space 32.

Figure 18:
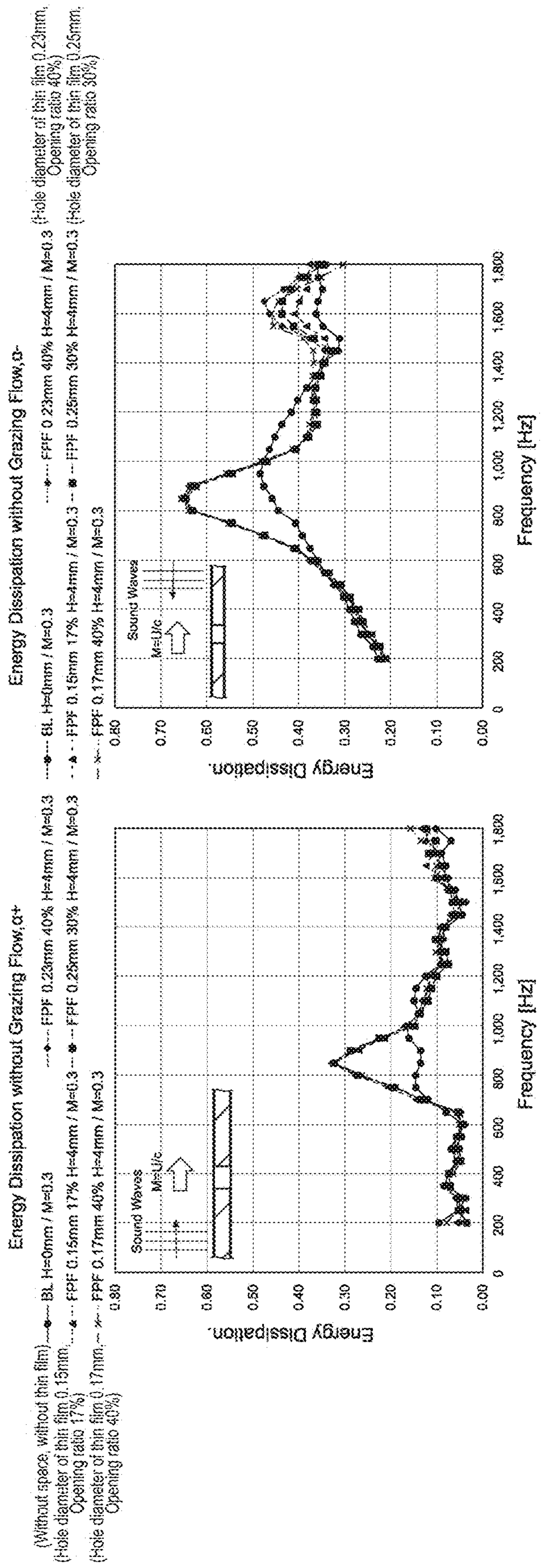
FIG. 18 shows Experimental example 9.

FIG. 18 shows Experimental example 9.

As test pieces of this embodiment, four types of the acoustic absorption panel 1 having different hole diameters of the hole 21 of the thin film 20 and different opening ratios of the thin film 20 (0.15 mm/17%, 0.17 mm/40%, 0.23 mm/40%, 0.25 mm/30%) were prepared. As a comparative example, an acoustic absorption panel that does not include the partition member 30 including the spaces 32 and the thin film 20 (includes only the acoustic absorption panel main body 10) was prepared. The other conditions of the five types of test pieces are equal, in which the hole diameter of the hole 14 of the perforated member 11 is 1.9 mm, one hole is provided per cell, the thickness of the perforated member 11 is 4 mm, the opening ratio is 1.5%, and the depth of the space 32 of the partition member 30 is H=4 mm. The size of the cell 12 is 12 mm by 16 mm by 11 mm (w1×w2×h). The acoustic absorption coefficients of the sound waves in the same direction (α+) as the Grazing flow (Mach number M=0.3) and in the opposite direction (α−) thereof were measured.

There is no significant difference in acoustic absorption coefficient due to the difference in the hole diameter (0.15 mm to 0.25 mm) of the small hole 21 of the thin film 20 and the opening ratio (17% to 40%) of the thin film 20. Meanwhile, the acoustic absorption coefficient of the acoustic absorption panel 1 including the spaces 32 is drastically high as compared to the acoustic absorption coefficient of the acoustic absorption panel main body 10 alone. Thus, a dominant parameter is the thickness of the space 32. On the other hand, the shape of the thin film 20 may be effective depending on the hole diameter of the hole 14 of the perforated member 11, the thickness (thinness) of the perforated member 11, and the depth of the space 32.

Figure 19:
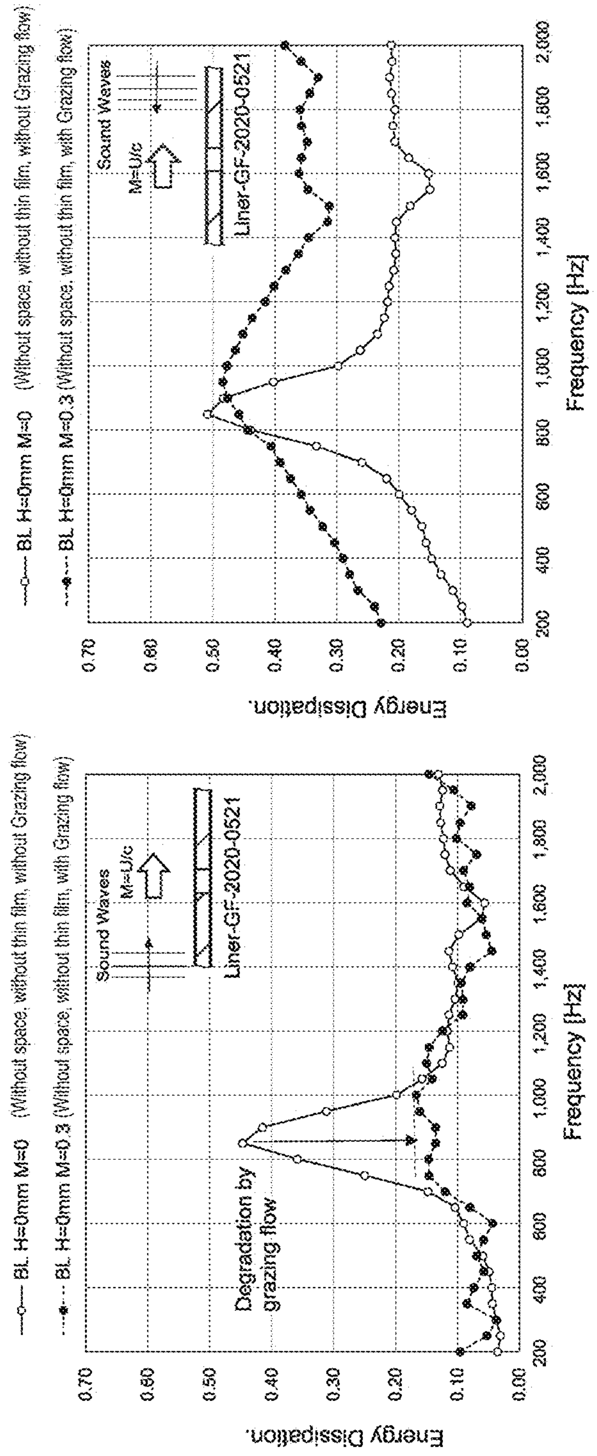
FIG. 19 shows Experimental example 10.

FIG. 19 shows Experimental example 10.

As a test piece of this embodiment, the following were set, in which the hole diameter of the hole 14 of the perforated member 11 is 1.9 mm, one hole is provided per cell, the thickness of the perforated member 11 is 4 mm, the opening ratio is 1.5%, and an effective acoustic absorption surface of the perforated member 11 has 60 mm width by 93 mm length. The size of the cell 12 is 12 mm by 16 mm by 11 mm (w1×w2×h). The test piece of this embodiment does not include the partition member 30 including the spaces 32 and the thin film 20 and includes only the acoustic absorption panel main body 10. The acoustic absorption coefficients of the sound waves in the same direction (α+) as the Grazing flow (Mach number M=0.3) and in the opposite direction (α−) thereof were measured in the case where the Grazing flow (Mach number M=0.3) is present and in the case of a stationary field (Mach number M=0) where the Grazing flow is absent.

As shown in the left part of the figure, the acoustic absorption coefficient of the resonant frequency in the stationary field (Mach number M=0) where the Grazing flow is absent is 0.45. Meanwhile, the acoustic absorption coefficient of the resonant frequency of the sound waves propagating in the same direction (α+) as the Grazing flow (Mach number M=0.3) is 0.20 or less. From the above, in order that the sound waves propagating in the same direction (α+) as the Grazing flow (Mach number M=0.3) obtains an acoustic absorption amount equivalent to that in the stationary field, the area of the perforated member 11 needs to be approximately twice. As shown in the right part of the figure, a broadband acoustic absorption coefficient of the sound propagating in the opposite direction (α−) of the Grazing flow (Mach number M=0.3) increases, but the acoustic absorption coefficient of the resonant frequency decreases.

Figure 20:
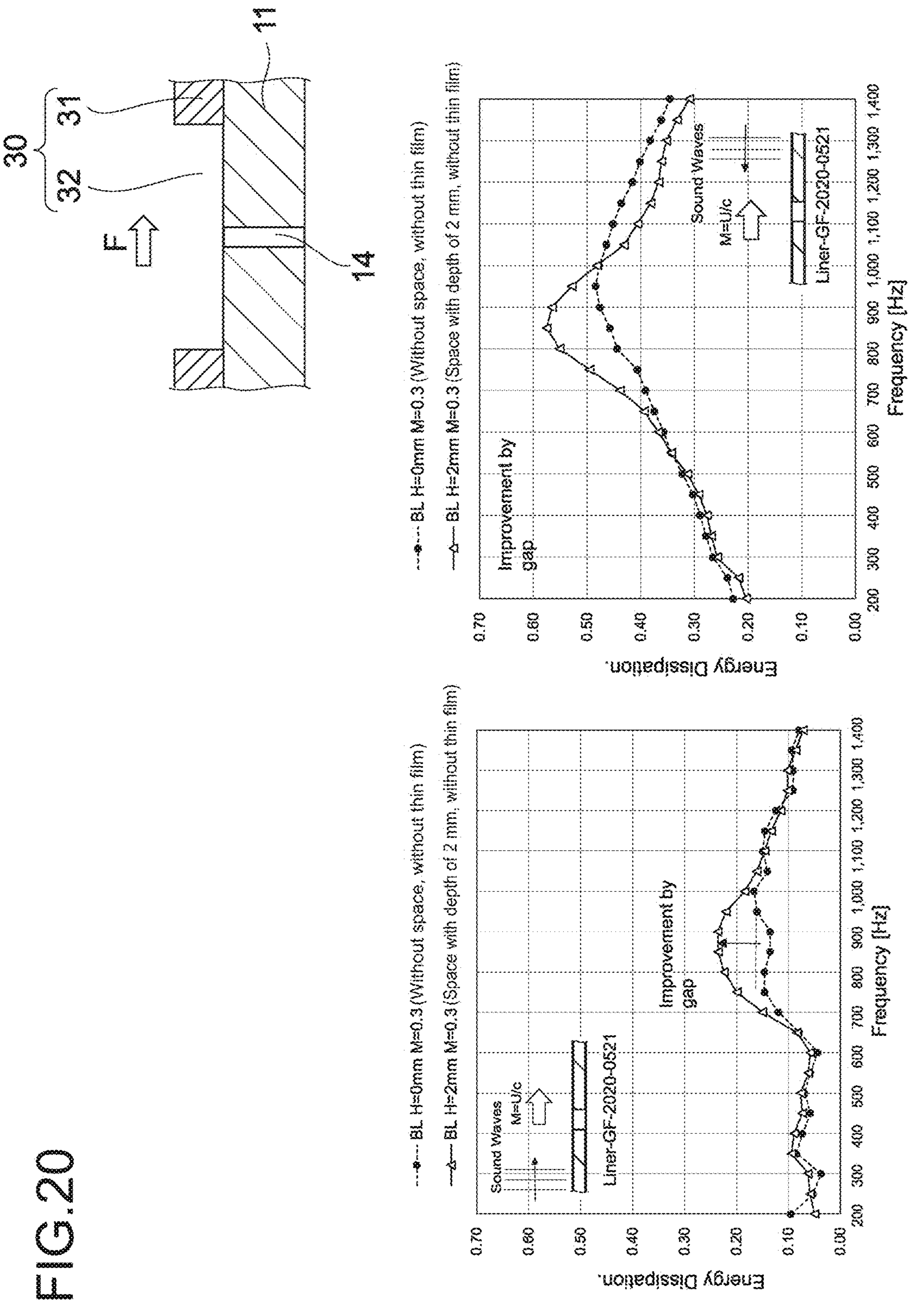
FIG. 20 shows Experimental example 11.

FIG. 20 shows Experimental example 11.

As a test piece of this embodiment, an acoustic absorption panel that includes the partition member 30 including the spaces 32 (depth of 2 mm) was prepared. The other conditions of the acoustic absorption panel are similar to those of the test piece of Experimental example 10. The test piece of this embodiment is an acoustic absorption panel that does not include the thin film 20 and includes the partition member 30 including the spaces 32, the partition member 30 being disposed on the perforated member 11. As a comparative example, the test piece of Experimental example 10 (acoustic absorption panel main body 10 alone) was used. The acoustic absorption coefficients of the sound waves in the same direction (α+) as the Grazing flow (Mach number M=0.3) and in the opposite direction (α−) thereof were measured in the case where the Grazing flow (Mach number M=0.3) is present and in the case of a stationary field (Mach number M=0) where the Grazing flow is absent.

As shown in the left part of the figure, the peak of the acoustic absorption coefficient of the resonant frequency of the sound waves propagating in the same direction (α+) as the Grazing flow (Mach number M=0.3) was 0.23. At the frequency of 850 Hz at the peak of the acoustic absorption coefficient, the acoustic absorption coefficient of the comparative example was 0.16. As a result, the acoustic absorption coefficient at the peak was increased from 0.16 to 0.23.

As shown in the right part of the figure, the peak of the acoustic absorption coefficient of the resonant frequency of the sound waves propagating in the opposite direction (α−) of the Grazing flow (Mach number M=0.3) was 0.57. At the frequency of 850 Hz at the peak of the acoustic absorption coefficient, the acoustic absorption coefficient of the comparative example was 0.48. As a result, the acoustic absorption coefficient at the peak was increased from 0.48 to 0.57.

It is found from the above that, even if the thin film 20 is not provided, the acoustic absorption coefficient rises by the acoustic absorption panel that includes the partition member 30 including the spaces 32, the partition member 30 being disposed on the perforated member 11.

Figure 21:
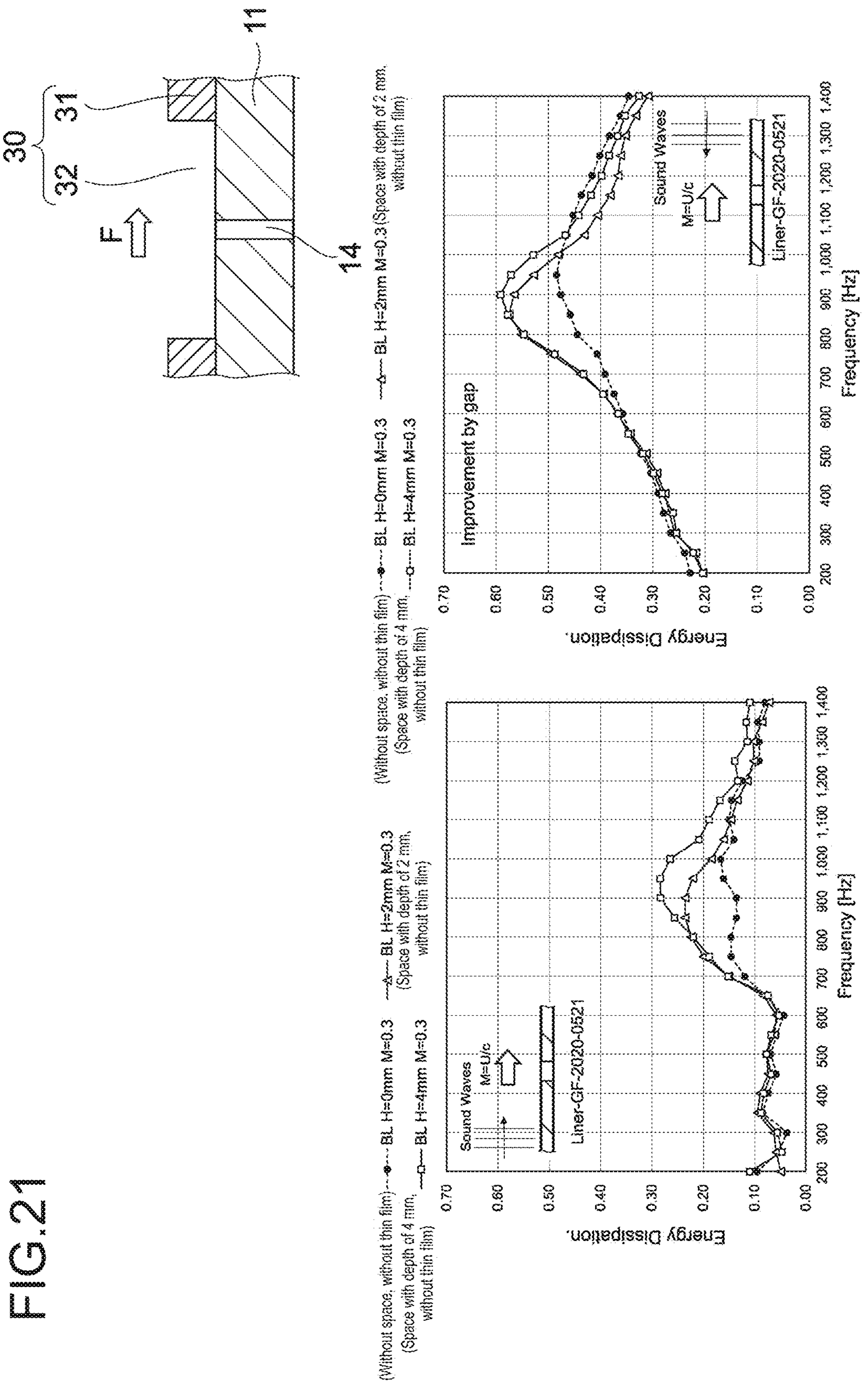
FIG. 21 shows Experimental example 12.

FIG. 21 shows Experimental example 12.

As test pieces of this embodiment, test pieces having different depths (4 mm, 2 mm, and 0 mm) of the space 32 were compared. The other conditions of the acoustic absorption panel are similar to those of the test piece of Experimental example 11. The test piece of this embodiment is an acoustic absorption panel that does not include the thin film 20 and includes the partition member 30 including the spaces 32 (the depth of the space 32 is 4 mm and 2 mm), the partition member 30 being disposed on the perforated member 11. The depth of 0 mm of the space 32 means the acoustic absorption panel main body 10 alone.

The peak of the acoustic absorption coefficient of the resonant frequency of the sound waves propagating in the same direction (α+) as the Grazing flow (Mach number M=0.3) and in the opposite direction (α−) thereof is maximum in the acoustic absorption panel 1 in which the depth of the space 32 is 4 mm. On the other hand, if the depth of the space 32 is changed to twice, from 2 mm to 4 mm, the increase of the acoustic absorption coefficient is limited.

Figure 22:
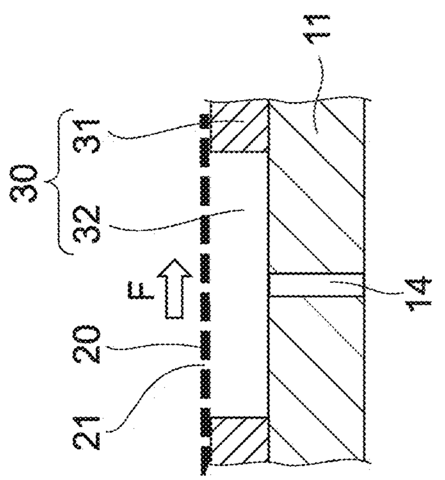
FIG. 22 shows Experimental example 13.
Figure 22:
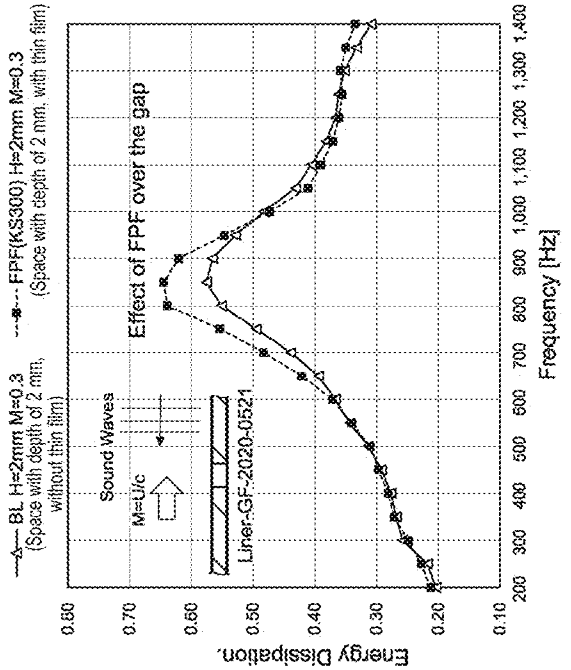
Figure 22:
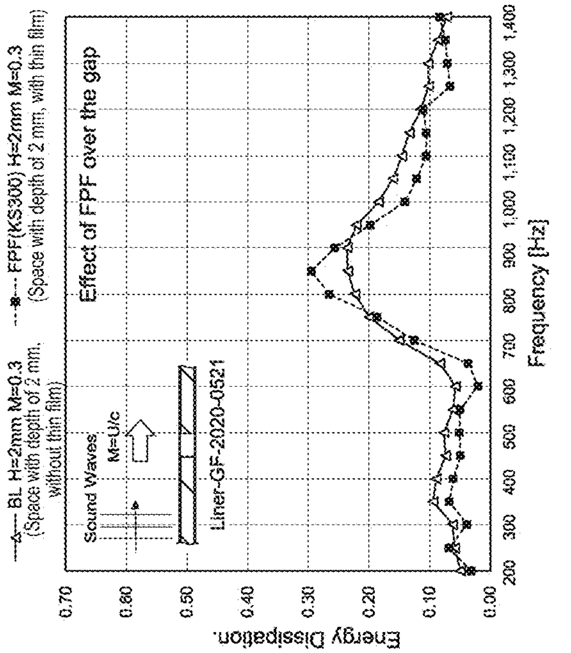

FIG. 22 shows Experimental example 13.

As a test piece of this embodiment, a test piece in which the thin film 20 is disposed and the depth of the space 32 is 2 mm was prepared. As a comparative example, the test piece of the Experimental example 12 (the depth of the space 32 is 2 mm, without the thin film 20) was used. The hole diameter of the small hole 21 of the thin film 20 is 0.15 mm, the opening ratio is 17%, and the film thickness is 0.1 mm. The other conditions of the acoustic absorption panel are similar to those of the test piece of Experimental example 11.

As shown in the left part of the figure, the peak of the acoustic absorption coefficient of the resonant frequency of the sound waves propagating in the same direction (α+) as the Grazing flow (Mach number M=0.3) was 0.29. At the frequency of 850 Hz at the peak of the acoustic absorption coefficient, the acoustic absorption coefficient of the comparative example (the depth of the space 32 is 2 mm, without the thin film 20) was 0.23. As a result, the acoustic absorption coefficient at the peak was increased from 0.23 to 0.29. In addition, as compared to the acoustic absorption coefficient of 0.16 at the frequency of 850 Hz of the test piece of Experimental example 11 (without the space 32, without the thin film 20), the acoustic absorption coefficient was increased by approximately 1.8 times.

As shown in the right part of the figure, the peak of the acoustic absorption coefficient of the resonant frequency of the sound waves propagating in the opposite direction (α−) of the Grazing flow (Mach number M=0.3) was 0.64. At the frequency of 850 Hz at the peak of the acoustic absorption coefficient, the acoustic absorption coefficient of the comparative example (the depth of the space 32 is 2 mm, without the thin film 20) was 0.57. As a result, the acoustic absorption coefficient at the peak was increased from 0.57 to 0.64. In addition, as compared to the acoustic absorption coefficient of 0.48 at the frequency of 850 Hz of the test piece of Experimental example 11 (without the space 32, without the thin film 20), the acoustic absorption coefficient was increased by approximately 30%.

Figure 23:
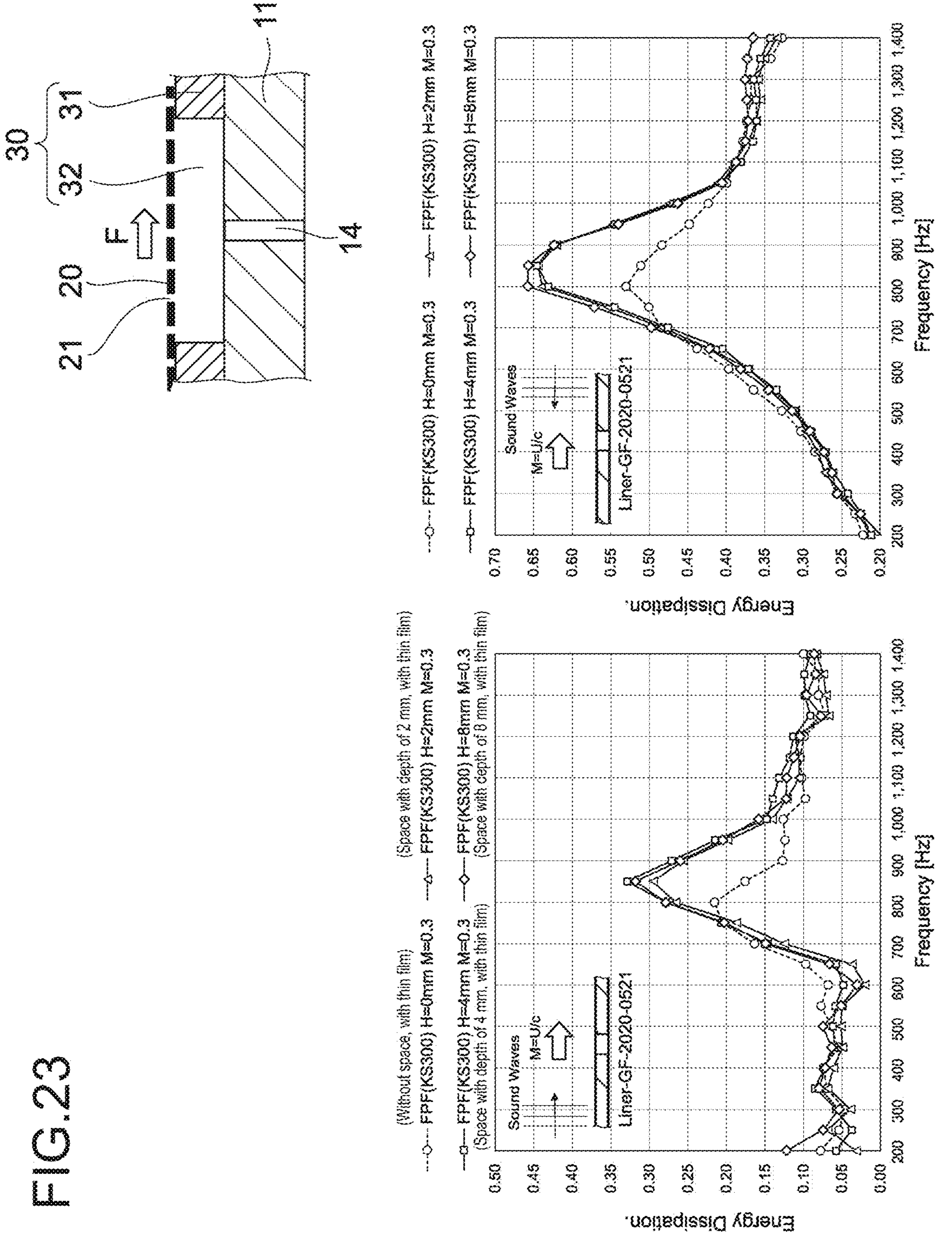
FIG. 23 shows Experimental example 14.

FIG. 23 shows Experimental example 14.

Four types of test pieces having different depths (8 mm, 4 mm, 2 mm, and 0 mm) of the space 32 were compared. The other conditions of the acoustic absorption panel 1 are similar to those of the test piece of Experimental example 13. The test piece of this embodiment is an acoustic absorption panel that includes the partition member 30 including the spaces 32 (the depth of the space 32 is 8 mm, 4 mm, and 2 mm), the partition member 30 being disposed on the perforated member 11, and includes the thin film 20 provided on the surface of the partition member 30. The depth the space 32 being 0 mm means that the acoustic absorption panel includes the thin film 20 directly provided on the surface of the perforated member 11.

The peak of the acoustic absorption coefficient of the resonant frequency of the sound waves propagating in the same direction (α+) as the Grazing flow (Mach number M=0.3) and in the opposite direction (α−) thereof is larger in the acoustic absorption panel 1 including the spaces 32 than in the acoustic absorption panel without spaces 32. Even if the depth of the space 32 is changed to twice, from 2 mm to 4 mm, the increase of the acoustic absorption coefficient is limited. In particular, when the depth of the space 32 is 4 mm (twice the hole diameter of 1.9 mm of the hole 14 of the perforated member 11) or more, it is found that the acoustic absorption coefficient tends to saturate.

Figure 24:
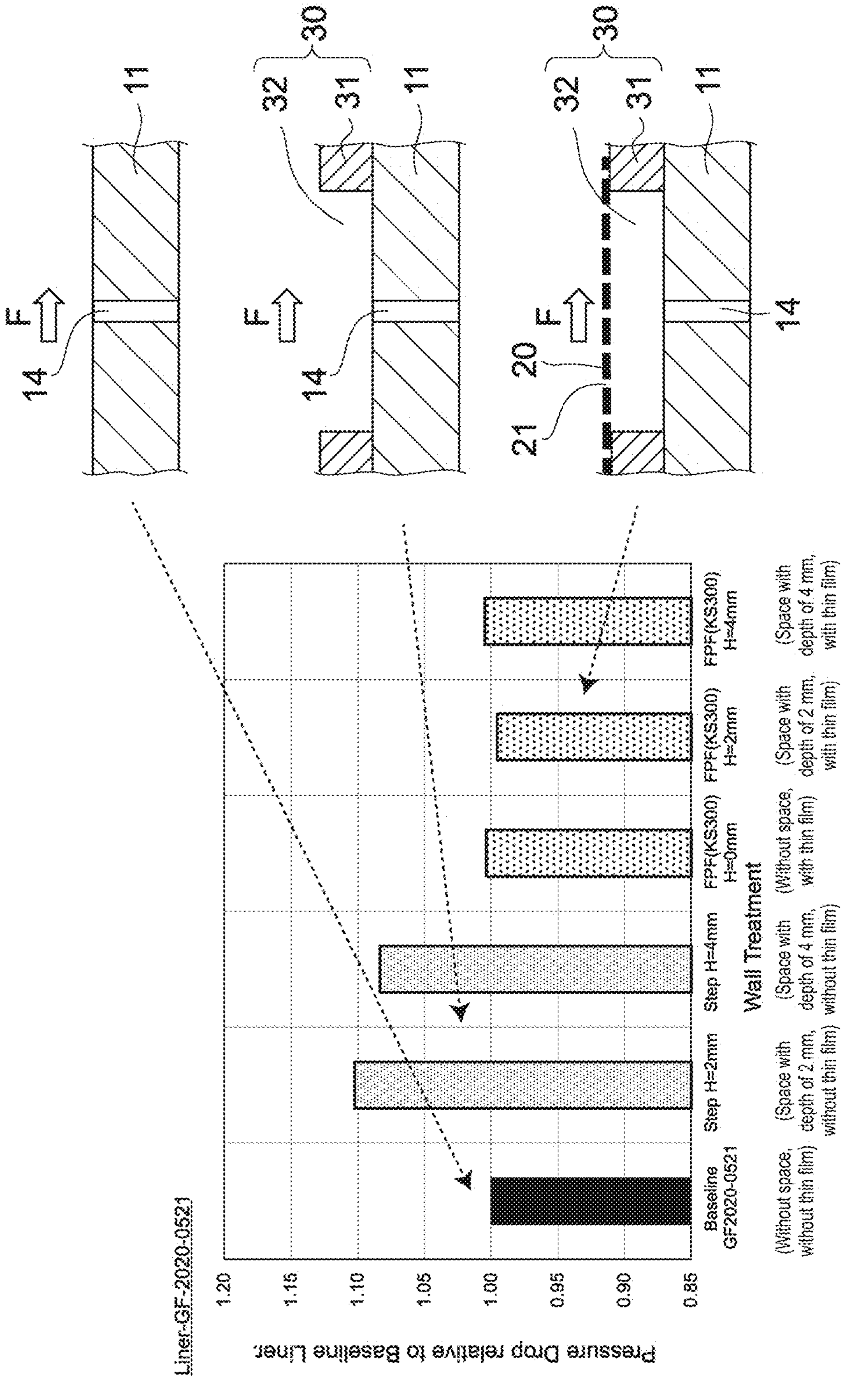
FIG. 24 shows Experimental example 15.

FIG. 24 shows Experimental example 15.

From the left part of the figure in sequence, six types of pressure drop in the test piece (acoustic absorption panel main body 10 alone) of Experimental example 10 (FIG. 18); two types of test pieces (without the thin film 20, the depth of the space 32 is 2 mm and 4 mm) of Experimental example 12 (FIG. 20); and three types of test pieces (with the thin film 20, the opening ratio is 17%, the depth of the space 32 is 0 mm, 2 mm, and 4 mm) of Experimental example 14 (FIG. 20) were compared.

In the two types of test pieces (without the thin film 20, the depth of the space 32 is 2 mm and 4 mm) of Experimental example 12 (FIG. 20), a pressure drop of approximately 10% occurs with respect to the test piece (acoustic absorption panel main body 10 alone) of Experimental example 10 (FIG. 18). On the other hand, if the space 32 is covered with the thin film 20 (opening ratio 17%), the pressure drop is reduced to a value similar to that of the case including the acoustic absorption panel main body 10 alone.

MODIFIED EXAMPLES

FIGS. 25(*a*)-25(*c*) show a modified example of the acoustic absorption panel.

In order to inhibit a decrease of the acoustic absorption performance by attaching the thin film 20, it is favorable to satisfy the condition: "the total opening area of the thin film 20>(1 to 4)×the area of the hole 14 of the perforated member 11" (A). Note that "the total opening area of the thin film 20=the area of the thin film 20×the opening ratio of the thin film 20". However, in the case of the acoustic absorption panel 1 in which the cross-sectional area of the cell 12 is small, it may be difficult to satisfy this condition (B). In such a case, if different types of resonators are combined in the space 32, a broadband acoustic absorption coefficient may be obtained (C). Since two types of resonators having different resonant frequencies do not work simultaneously, it is conceivable that one thin film 20 can be shared.

Use Applications of this Embodiment

Figure 26:
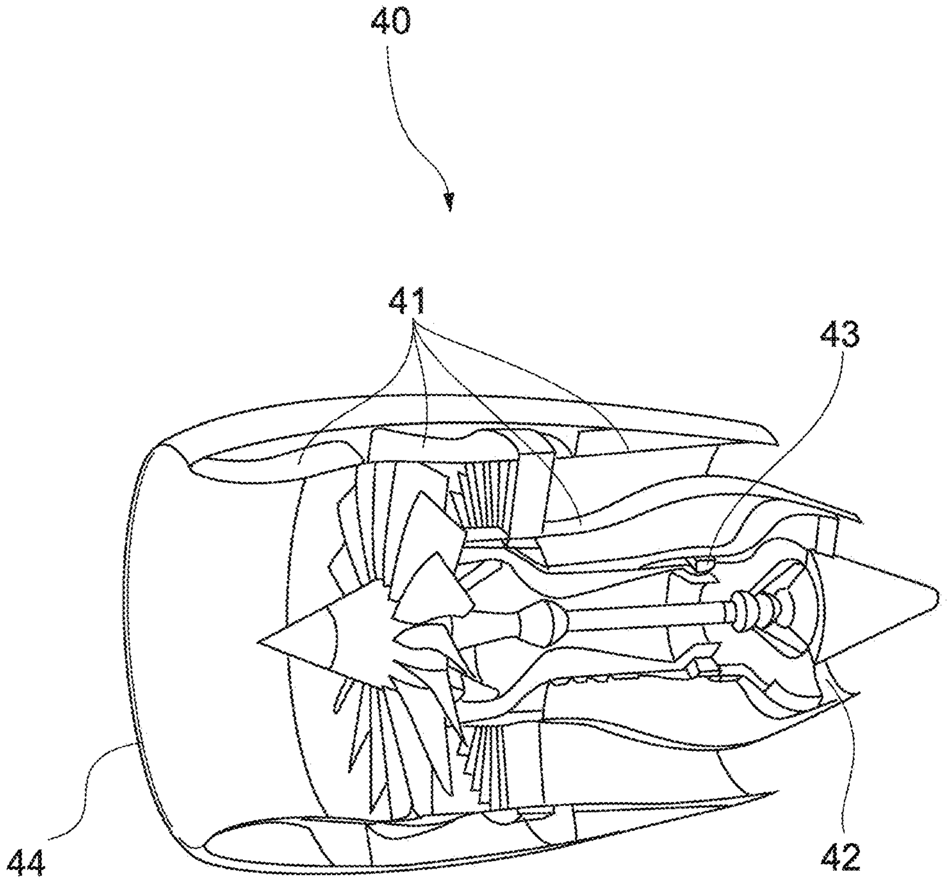
FIG. 26 shows a jet engine to which the acoustic absorption panel is applicable.

FIG. 26 shows a jet engine to which the acoustic absorption panel is applicable.

The acoustic absorption panel 1 according to this embodiment is typically applicable to a jet engine 40 of an aircraft. For example, the acoustic absorption panel 1 is installed on an inner wall of a duct (nacelle 41) that covers the jet engine 40, so that radiation of fan noise and compressor noise can be inhibited. The nacelle 41 includes an inner wall (recessed wall) and a core outer wall (convex wall) of a circular duct that covers the fan, and is at normal temperature. Sound waves propagate in the direction opposite to the airflow (Grazing flow) (frequency: several kHz, maximum Mach number of 0.3 to 0.5) on the upstream of the fan, and in the opposite direction on the downstream of the fan.

The acoustic absorption panel 1 is installed on an inner wall (high temperature) of an exhaust flow path of a core portion 42 of the jet engine 40, so that radiation of combustion noise and turbine noise can be inhibited. The exhaust flow path is a circular pipe, a rectangular pipe, or a bent pipe. Sound waves propagate in the direction opposite to the airflow (frequency: depending on the frequency of a motor, airflow velocity: subsonic velocity range) on the suction side, and in the opposite direction on the exhaust side. The acoustic absorption panel 1 may be used together with an acoustic absorption material (bulk acoustic absorption material).

The acoustic absorption panel 1 is installed on an inner wall (1000° C. or more) of a combustor 43 of the jet engine 40, so that pressure fluctuation with a high amplitude (frequency: several hundred Hz to several kHz, airflow velocity: subsonic velocity range) associated with combustion (unstable combustion) can be suppressed. A configuration in which a resonator is provided to the inside of a cooling-air introducing hole and a space is provided to communicate with a combustion chamber may be provided. A heat-resistant thin film 20 may be attached.

The acoustic absorption panel 1 is applied to a suction and exhaust flow path of an auxiliary power apparatus of the jet engine 40, so that radiation of noise of the apparatus can be inhibited. The acoustic absorption panel 1 is applied to an intake 44 (inlet port) of a high-speed propulsion system of the jet engine 40, so that pressure fluctuation and engine noise can be suppressed.

The acoustic absorption panel 1 is applied to an inner wall of a duct of a ducted propeller of a drone or commuter aircraft, so that noise from the apparatus can be inhibited.

CONCLUSION

Conventional acoustic absorption panels used for the duct and the like have had the following technical problems.

(1) Decrease in acoustic absorption performance under the condition when placed in an airflow (Grazing condition)
(2) Decrease in performance of fluid machinery or the acoustic absorption panel due to the presence of a perforated surface plate (pressure drop, inlet distortions, acoustic absorption coefficient)
(3) Insufficient impact strength against use of a surface plate made of material other than metal
(4) Maintainability and lifetime of the acoustic absorption panel
(5) Additional performance and simplicity applicable to an existing acoustic absorption panel as well In other words, for example, if the acoustic absorption panel is installed on a wall surface of a propagation path to inhibit noise from propagating, normally, an airflow exists on the surface of the acoustic absorption panel. Sound waves are transmitted through the airflow and react with the acoustic absorption panel to reduce a sound pressure, and in addition thereto, the presence of the airflow changes the acoustic absorption performance. The acoustic absorption coefficient shown in a stationary field by the acoustic absorption panel with a defined resonant frequency tends to decrease its level due to the increase in airflow velocity, and sometime change the resonant frequency.

The change in acoustic absorption performance and resonant frequency by the Grazing flow will be described using FIG. 8. In general, when the Grazing flow increases, the peak of the acoustic absorption coefficient decreases, whereas a frequency band at which acoustic absorption is performed tends to increase. A frequency (resonant frequency) corresponding to the peak of the acoustic absorption coefficient also changes with the increase in the Grazing flow velocity. Those tendencies show a deviation of the acoustic absorption performance from the design point.

Deteriorating the acoustic absorption performance especially optimized at the resonant frequency due to the presence of the Grazing flow leads to a negative effect in the application of the acoustic absorption panel. In the example of FIG. 8, an energy acoustic absorption coefficient decreases by 30 to 40% at the main flow Mach number of 0.3, and a loss of 2 dB is caused in terms of decibel (dB) that is a unit of logarithmic scale for sound.

In the hole 14 (the plurality of holes) of the surface panel, the increase of the Grazing flow leads to hydrodynamic dissipation of a wake due to the presence of the holes 14 and also leads to interference with the downstream holes 14 and to degradation of the acoustical performance of the panel. Macroscopically, it may increase the inflow disturbance into fluid machinery that generates an airflow, for example, a fan of a jet engine, and may affect the fan efficiency and operation.

Foreign matter may flow into a flow path in which the Grazing flow is present, and collide with the acoustic absorption panel. As a consequence of the collision, the damage of the panel directly leads to a degradation of the acoustical performance, and the damaged panel pieces lead to a new equipment failure. In general, the perforated surface plate is fragile against impact, and has a possibility of breakage particularly when a resin or the like other than a hard material such as metal is used. Even if breakage does not occur, there is a problem that surface wear degrades the performance of the panel and its replacement timing is accelerated. Further, from the viewpoint of maintaining the acoustic absorption panel mounted on a duct, stains or contamination of dust on the surface plate of the acoustic absorption panel having a hole diameter of 1 to several mm also become problems.

If it is desired to improve the performance of an existing acoustic absorption panel, removing the existing acoustic absorption panel or manufacturing a new acoustic absorption panel with another shape is disadvantageous in cost and required time. Whether or not additional measures can be taken with the existing panel being mounted is one of practical issues. It is also desirable that the additional measures be convenient.

In contrast to the above, the acoustic absorption panel 1 according to this embodiment is constituted by attaching the partition member 30 including the spaces 32, and the thin film 20 including a large amount of small holes 21 perforated, in which a plurality of small holes 21 are perforated in a region corresponding to at least the above spaces 32, on the surface of the acoustic absorption panel main body 10, that is, for example, an existing acoustic absorption panel having a surface on which the holes 14 for acoustic absorption are provided, by using an adhesive (illustration omitted), for example. Thus, the acoustic absorption panel 1 according to this embodiment produces the following effects.

(1) The acoustic absorption panel 1 according to this embodiment improves the peak acoustic absorption coefficient under the condition where the Grazing flow is present. Usually, as the Grazing flow increases, the peak of the acoustic absorption coefficient decreases and the resonant frequency changes. Problems hard to predict by the initially designed performance of the panel are solved. In Experimental example 5 (FIG. 13) described above, the measurement for the acoustic absorption panel was performed using a special apparatus that measures the acoustic absorption coefficient in a flow field. The example in which the main flow center Mach number is increased to 0.3 was shown as the condition of the Grazing flow. In the same direction as the main flow, at the main flow Mach number of 0.3, an improved effect is obtained by 3 dB with respect to the case of including the acoustic absorption panel main body 10 alone, and by 1.8 dB with respect to the case where the partition member 30 including the spaces 32 is absent and the thin film 20 is directly attached to the perforated member 11.

(2) The acoustic absorption panel 1 according to this embodiment suppresses disturbance of a flow caused on the surface thereof by the holes 14 of the acoustic absorption panel main body 10. The disturbance of the flow affects acoustic characteristics of the holes 14 and the cells 12 of the acoustic absorption panel main body 10 located on the downstream of the flow (interference of flow). The thin film 20 suppresses the disturbance, and as a result, is expected to suppress a decrease in acoustic absorption performance due to the interference of a flow. Suppressing the disturbance stabilizes the operation of fluid machinery, for example, the fan located on the downstream and contributes to improvement in efficiency of the whole system.

(3) With the acoustic absorption panel 1 according to this embodiment, the thin film 20 attached to the acoustic absorption panel main body 10 is effective in mitigating the impact on the acoustic absorption panel main body 10 and avoiding a tear caused by scattered matter. The thin film 20 hydrodynamically has strong impermeability due to its small holes 21 and suppresses contamination of dust and the like into the cells 12. The acoustic absorption panel 1 can be cleaned by replacing the thin film 20 and is expected to eliminate the removal of the acoustic absorption panel main body 10 and further the overhaul of the engine and the like including the duct, which contributes to longer service life of the acoustic absorption panel 1.

(4) The acoustic absorption panel 1 according to this embodiment has a basic configuration in which the partition member 30 including the spaces 32 is disposed on the acoustic absorption panel main body 10, and the thin film 20 including the small holes 21 is attached to the partition member 30. This embodiment can be additionally applied to an existing acoustic absorption panel (acoustic absorption panel main body) and its method is simple.

(5) The acoustic absorption panel 1 according to this embodiment is effective in inhibiting water droplets on the surface of the thin film 20 from permeating into the inside of the cells 12. It is also possible to inhibit the water droplets from entering the small holes 21 by selecting the diameter of the small holes 21 in consideration of surface tension of the water droplets.

Installation Types of Acoustic Absorption Panel

The acoustic absorption panel 1 according to this embodiment has the following possible types.

(Type 1)

The acoustic absorption panel 1 is installed on a wall surface of a propagation path to inhibit noise from propagating.

The propagation path is usually a flow path such as a duct. In this type, the perforated member 11 is installed on the wall surface of the propagation path, and a cell 12 and a back wall 13 are located behind the perforated member 11. An airflow may be present inside the propagation path, and the airflow may have a velocity distribution or a temperature distribution in the cross-sectional direction of the path. Noise may propagate in the same direction as the airflow and in the direction opposite thereto. Further, noise may have an acoustic mode (a sound pressure distribution having antinodes and nodes of a sound pressure, which includes a plurality of sound pressure distributions present at the same frequency, and a change over time of a sound pressure distribution at a spatial position) corresponding to the cross-sectional shape of the path. Specific examples are as follows.

- The acoustic absorption panel 1 is installed on an inner wall of a suction duct or exhaust duct of a jet engine of an aircraft, to mitigate a sound pressure before the noise generated in a fan is released to the outside of the engine.
- The thin film of the present invention is installed on a surface of an existing acoustic absorption panel, to increase an effect of mitigating fan noise.
- The acoustic absorption panel 1 is installed on a part of an inner wall of a combustion chamber of a gas turbine or an inner wall of an exhaust flow path, to mitigate a sound pressure before the sound generated in the combustor or turbine is released to the outside of the engine.
- In ground operation facility of a jet engine, the acoustic absorption panel 1 is installed on an inner wall of a duct through which high-speed exhaust jets after cooling are introduced and exhausted to the outside, to mitigate high-sound pressure noise due to jet noise.
- In power generation facility, the acoustic absorption panel 1 is installed on an inner wall of a duct on an air suction side, to attenuate the noise generated from a blower, a compressor, or the like before the noise is released to the outside.

(Type 2)

The acoustic absorption panel 1 is installed on a wall surface on which noise is incident, to inhibit noise from reflecting.

In this type, the acoustic absorption panel 1 is installed on a wall or fence placed in an open space and a surface of a structure. An airflow may be present on the panel surface. The advance direction of incident noise may not be a direction perpendicular to the panel surface plate. Specific examples are as follows.

- The acoustic absorption panel 1 is installed on a wall surface of a room that requires silence, to suppress echoes in the room.
- The acoustic absorption panel 1 is installed on a surface of a fence provided to a route through which vehicles pass, to weaken the reflection of noise, which is generated from a vehicle or a road surface and then enters the wall, and to reduce the exposure amount of the noise to the surroundings.
- The acoustic absorption panel 1 is installed on a surface of a body of an aircraft (a fuselage surface, a high-lift apparatus such as a flap, a landing apparatus such as a landing gear or a retractable door), to suppress generation of aerodynamic noise, attenuation of boundary layer noise, and sound reflection from other sites such as the engine, and suppress radiation of the noise to a far side of the body.
- The body described above is not limited to the aircraft, and automobiles and railroad vehicles are also assumed. In the case of an automobile, the acoustic absorption panel 1 is installed on a part of the body, to suppress generation and absorption of a peeling sound from a door mirror, a peeling sound of a rear portion of the body, and a boundary layer sound of the vehicle body surface, and to mitigate noise to the outside and inside of the vehicle.
- In the case of a railroad vehicle, the acoustic absorption panel 1 is installed on the surface thereof, to suppress generation of an aerodynamic sound generated from a pantagraph, a vehicle body clearance, and a step during high-speed running, to suppress a surface reflection, and to suppress noise to the inside and outside of the vehicle.
- The acoustic absorption panel 1 described above is not limited to the case where the resonant acoustic absorption panel is disposed on the back of the thin film according to the present invention. Other than that acoustic absorption panel, a porous material or a fibrous acoustic absorption material is installed. In this case, the perforated member 11 is a surface plate of a bulk-type acoustic absorption material such as a porous material or a fiber material. "The perforated member 11 is a surface plate of a bulk-type acoustic absorption material such as a porous material or a fiber material" means both of (A) using a surface plate as the perforated member 11 and (B) using a bulk-type acoustic absorption material including a surface plate as the perforated member 11.

(Type 3)

The acoustic absorption panel 1 is installed on all or part of a boundary surface that covers a closed space, to reduce noise inside.

Assume a case of a closed space where a noise source is included and thus a noise field is formed, and a case of a closed space where a noise source is not included, but a noise field introduced from an external noise source through vibrations is formed. It is assumed that the acoustic absorption panel 1 is installed in all or part of the closed space, to attenuate an amplitude of noise propagating in the closed space by a panel surface, so that noise in the closed space is reduced as compared with the case where there is no panel. Specific examples area as follows.

- A heat-resistant acoustic absorption panel 1 is installed on an inner wall of a boiler or a combustor to absorb unstable combustion vibration or combustion noise generated in a combustion chamber, thus suppressing the unstable vibration and reducing the combustion noise propagating to the outside.
- The acoustic absorption panel 1 is installed on an inner wall of a rocket fairing, to mitigate a sound field in which an external sound generated at the time of launching a rocket is excited inside the fairing via vibration of the fairing.
- The acoustic absorption panel 1 is installed on an inner wall of an aircraft, to mitigate engine noise, aircraft body noise, and boundary layer noise propagating from the outside in the aircraft.
- The acoustic absorption panel 1 is installed on an inner wall of an automobile or a railroad vehicle, to mitigate noise propagating from the outside in the vehicle without being aware of the acoustic absorption wall.
- The acoustic absorption panel 1 is installed on a wall surface of a residential or working space. This includes wall surfaces of sound studios, concert halls, and downtown buildings. Because of the fine holes in the surface of the acoustic absorption panel 1 of the present invention, silence can be obtained without giving impression of the acoustic absorption wall. Additionally, painting of the wall surface and the like can be naturally performed, and an acoustic absorption effect and a design effect of the wall surface can be obtained.

Application Examples of Acoustic Absorption Panel According to Present Invention The acoustic absorption panel 1 according to this embodiment is also applicable to use applications other than the jet engine 40 of the aircraft (FIGS. 25(*a*)-25(*c*)).

The acoustic absorption panel according to the present invention is applicable to: an improvement in noise reduction capability of systems in which noise propagates in an air flow, such as aircraft, aircraft engines, power generators, motors, and an air-conditioned refrigerators; an improvement in acoustic absorption performance of general transportation equipment such as automobiles, trains, and aircraft in which an airflow and noise are mixed on the surface thereof; an improvement in structure strength of a noise reduction apparatus; an improvement in performance of a main body apparatus by the noise reduction apparatus; and the like. The application examples are as follows.

(Application Example 1) Suction and Exhaust Duct of Aircraft Jet Engine

A thin film is installed on an acoustic absorption panel surface on an inner wall surface of a duct. Small holes perforated in the thin film have a size of approximately 0.25 mm or less, and the opening ratio thereof is larger than that of panel holes such that multiple holes are present in the panel hole. A perforation position in the thin film may be changed such that a group of small holes is formed only at a portion where the panel hole is present. The thin film may be placed without clearance with the panel surface plate, or a clearance may be provided therebetween.

(Application Example 2) Suction and Exhaust Duct of Electric Generator, Motor, Etc Outside air is introduced into motors such as a steam and gas generator, an engine of a vehicle or the like, and an auxiliary power apparatus of an aircraft, and then exhausted after it is used in thermal engines. In some cases, an acoustic absorption panel is installed on an inner wall of a flow path (duct) for sucking outside air or a flow path (duct) for discharging air, and the thin film according to the present invention is installed on the surface that comes into contact with the airflow on the surface of the panel.

(Application Example 3) High-Temperature Exhaust Duct

When a metal honeycomb structure or a heat-resistant acoustic absorption material is used in a flow path through which a sound discharged from a high-temperature portion such as a gas turbine or an engine propagates, if a heat-resistant thin film with small holes according to the present invention is provided, it is expected to improve acoustic absorption performance, to protect the acoustic absorption member from heat, and to mitigate the loss even if the Grazing flow increases.

(Application Example 4) Combustor

Within combustors of terrestrial, aeronautical gas turbines, rocket engines, and the like, a high-amplitude pressure fluctuation occurs at middle to low frequencies associated with the combustion of hot gas. To mitigate this, a resonant chamber called a resonator may be provided to a wall surface of the combustor. Since an airflow is also present inside the combustor, a heat-resistant thin film according to the present invention is installed at an opening of the resonator, so that it is possible to promote the mitigation of the pressure fluctuation passing through the resonator.

In addition, the following ripple application methods are conceivable. It is applied to absorb pressure fluctuation generated on the wall surface along an airflow to mitigate the sound source intensity on the wall surface. It is applied to delay the occurrence of peeling caused on the wall surface with the airflow to mitigate the peeling noise. It is applied to improve the efficiency of the acoustic absorption wall or reduce broadband noise in a stationary field without airflow. It is applied to a device aiming at inhibiting peeling and reducing broadband noise for a bulk-type acoustic absorption material such as a porous material. It is applied to a device that not only suppresses noise but also inhibits peeling and reduces resistance. Specific application examples are given below.

For example, the acoustic absorption panel 1 can absorb pressure fluctuation occurring on a wall surface along an airflow and mitigate the sound source intensity on the wall surface. The acoustic absorption panel 1 can delay the occurrence of peeling caused on a wall surface with an airflow and can mitigate peeling sound. The acoustic absorption panel 1 can improve the efficiency of the acoustic absorption wall and reduce broadband noise in a stationary field without air flow. The acoustic absorption panel 1 is applicable to a device aiming at inhibiting peeling and reducing broadband noise for bulk-type acoustic absorption materials. The acoustic absorption panel 1 is applicable to a device that not only suppresses noise but also inhibits peeling and reduces resistance. The specific examples are as follows.

For example, the acoustic absorption panel 1 is applicable to each site of an aircraft. The acoustic absorption panel 1 is applied to a fuselage surface to reduce noise of a boundary layer. The acoustic absorption panel 1 is applied to a wing to suppress peeling and reduce aerodynamic noise. If an airflow (frequency: defined by Strouhal number St=frequency×representative dimension/frequency, airflow velocity: subsonic velocity range) is present on a surface of a wing, a landing apparatus, or the like, fluid-related noise is generated.

The acoustic absorption panel 1 is applied to a high-lift apparatus to suppress a sound source. The acoustic absorption panel 1 is applied to a landing apparatus (including a storage unit) to suppress a sound source. The acoustic absorption panel 1 is applied to an auxiliary power apparatus to reduce engine noise.

For example, the acoustic absorption panel 1 is applicable to each railroad-related site. The acoustic absorption panel 1 is applied to a body of a railroad vehicle to reduce peeling and noise of a boundary layer. The acoustic absorption panel 1 is applied to a power collector to reduce peeling and noise of a boundary layer. The acoustic absorption panel 1 is applied to an inner wall of a tunnel of a high-speed railroad to reduce inrush pressure waves. The inner wall surface of the tunnel is exposed to inrush pressure waves, pressure waves and sound waves of high amplitude, high-speed jets, and shock waves (frequency: single wave, broadband frequency, etc., airflow velocity: subsonic to supersonic velocities, temperature: high temperature is possible). In such environments, the pressure fluctuation, the airflow, and the high-amplitude sound are suppressed. The acoustic absorption panel 1 is also applicable to not only high-speed railroad tunnels but also a spacecraft-launching site, a runway, a high-speed propulsion engine air inlet, and the like in such environments.

For example, the acoustic absorption panel 1 is applicable to each site of a vehicle. The acoustic absorption panel 1 is applied to a body of a vehicle to mitigate a wind noise source. The acoustic absorption panel 1 is applied to a door mirror to suppress peeling and suppress a sound source. The acoustic absorption panel 1 is applied to an exhaust pipe to suppress an engine sound.

For example, the acoustic absorption panel 1 is applicable to each site of a windmill for wind-power generation. The acoustic absorption panel 1 is applied to a blade to mitigate a wind noise sound. The acoustic absorption panel 1 is applied to a support pillar to suppress an interference sound source. The acoustic absorption panel 1 is applied to an electric generator chamber to absorb a gear sound or the like.

For example, the acoustic absorption panel 1 is applicable to each site of marine engines and power generation facilities. The acoustic absorption panel 1 is applied to an suction/exhaust flow path or an enclosure to absorb sounds. For example, the acoustic absorption panel 1 is applied to the inside of a fairing of a spacecraft, air conditioning equipment, ground structures, and the like to absorb sounds. An enclosure for motor arrangement in a plant or the like and an inner wall of a room mounted on a spacecraft are wall surfaces of closed spaces that are exposed to a high-amplitude pressure and a sound pressure, and such pressures and the like may lead to damage to the equipment. The acoustic absorption panel 1 is applied to such environments, so that pressure fluctuation and high-amplitude noise can be reduced.

Each embodiment and each modified example of the present technology have been described above, but the present technology is not limited to the embodiments described above and can be variously modified as a matter of course without departing from the gist of the present technology.

REFERENCE SIGNS LIST

1: acoustic absorption panel
10: acoustic absorption panel main body
11: perforated member
12: cell
14: hole
20: thin film
21: small hole
30: partition member
31: partition wall
32: space

The invention claimed is:

1. A pressure fluctuation absorbing structure, comprising:
an acoustic absorption panel body including:
a perforated member including a plurality of holes for absorbing pressure fluctuation on a surface thereof, and
a plurality of cells that are provided to a back surface of the perforated member and communicate with the plurality of holes,
a partition member disposed on the surface of the perforated member and including:
a partition wall that partitions the plurality of holes into units of a predetermined number of one or more holes, and
a space that is formed by the partition wall and corresponds to the predetermined number of one or more holes and the plurality of cells,
a fine-perforated thin film that is disposed on the partition member away from the perforated member to cover the space and includes a plurality of small holes perforated in a region corresponding to the space, wherein
a total opening area of the plurality of small holes of thin film provided in the region corresponding to the space is larger than a total opening area of the predetermined number of one or more holes of the perforated member corresponding to the space, and
a depth of the space is larger than a diameter of the plurality of holes of the perforated member.

2. The pressure fluctuation absorbing structure according to claim 1, wherein
the depth of the space is larger than twice the diameter of the plurality of holes of the perforated member.

3. The pressure fluctuation absorbing structure according to claim 1, wherein
the plurality of holes are located at a center of an upstream side of the space with respect to a main flow direction of a fluid on a surface of the pressure fluctuation absorbing structure.

4. The pressure fluctuation absorbing structure according to claim 1, wherein
a total opening area of the plurality of small holes of the thin film provided in the region corresponding to the space is larger than twice a total opening area of the predetermined number of one or more holes of the perforated member corresponding to the space.

5. The pressure fluctuation absorbing structure according to claim 4, wherein
the total opening area of the plurality of small holes of the thin film provided in the region corresponding to the space is larger than four times the total opening area of the predetermined number of one or more holes of the perforated member corresponding to the space.

6. The pressure fluctuation absorbing structure according to claim 1, wherein
a diameter of the small holes of the thin film is larger than 1/20 and smaller than 1/5 of the diameter of the plurality of holes of the perforated member.

7. The pressure fluctuation absorbing structure according to claim 1, wherein
an opening percentage of the plurality of small holes in the thin film corresponding to the space is 10% or more.

8. The pressure fluctuation absorbing structure according to claim 7, wherein
the opening percentage is 30% or more.

9. The pressure fluctuation absorbing structure according to claim 1, wherein
the opening percentage of the plurality of small holes in the thin film corresponding to the space is larger than twice an opening percentage of the predetermined number of one or more holes of the perforated member corresponding to the space.

10. The pressure fluctuation absorbing structure according to claim 9, wherein
the opening percentage of the plurality of small holes in the thin film corresponding to the space is larger than four times the opening percentage of the predetermined number of one or more holes of the perforated member corresponding to the space.

11. The pressure fluctuation absorbing structure according to claim 1, wherein
the thin film is disposed on a surface of the partition member or disposed on a side surface of the partition wall of the partition member.

12. The pressure fluctuation absorbing structure according to claim 1, wherein
the thin film includes
a first thin film disposed on a surface of the partition member, and
a second thin film disposed on a side surface of the partition wall of the partition member, and in a region corresponding to the space, an opening percentage of a plurality of small holes perforated in the second thin film is larger than an opening percentage of a plurality of small holes perforated in the first thin film.

13. The pressure fluctuation absorbing structure according to claim 1, wherein the perforated member has a surface inclined with respect to the thin film.

14. The pressure fluctuation absorbing structure according to claim 13, wherein a distance between the surface of the perforated member and the thin film in a depth direction of the space is different between an upstream side and a downstream side in a main flow direction of a fluid on a surface of the pressure fluctuation absorbing structure.

15. The pressure fluctuation absorbing structure according to claim 1, wherein the thin film has a surface inclined with respect to the main flow direction of the fluid on the surface of the pressure fluctuation absorbing structure.

16. The pressure fluctuation absorbing structure according to claim 1, wherein a thickness of the thin film is 1/10 or more of the diameter of the plurality of small holes.

17. The pressure fluctuation absorbing structure according to claim 1, wherein the plurality of small holes of the thin film has a hole diameter that transmits pressure fluctuation.

18. The pressure fluctuation absorbing structure according to claim 1, wherein the thin film is formed by laminating thin film materials subjected to etching processing.

19. The pressure fluctuation absorbing structure according to claim 1, wherein a cross-sectional shape of the plurality of small holes is a rectangular shape, a parallelogram shape, or a trapezoidal shape.

20. The pressure fluctuation absorbing structure according to claim 1, wherein a fluid on the surface of the pressure fluctuation absorbing structure has a main flow velocity.

21. The pressure fluctuation absorbing structure according to claim 20, wherein the main flow velocity is a supersonic velocity.

22. The pressure fluctuation absorbing structure according to claim 1, wherein a back surface of the perforated member is capable of being provided with a cell that communicates with one or more holes, and the space of the partition member corresponds to the plurality of cells.

23. The pressure fluctuation absorbing structure according to claim 22, wherein the space of the partition member is shared by the plurality of the cells.

24. The pressure fluctuation absorbing structure according to claim 1, wherein the perforated member is a surface plate of a bulk-type acoustic absorption material of a porous material or a fibrous material.

* * * * *